US011213772B2

(12) United States Patent
Mitchell et al.

(10) Patent No.: US 11,213,772 B2
(45) Date of Patent: Jan. 4, 2022

(54) LIQUID SOLID SEPARATOR

(71) Applicants: John Christopher Mitchell, Apopka, FL (US); Michael Westley Anderson, Riverside, CA (US)

(72) Inventors: John Christopher Mitchell, Apopka, FL (US); Michael Westley Anderson, Riverside, CA (US)

( * ) Notice: Subject to any disclaimer, the term of this patent is extended or adjusted under 35 U.S.C. 154(b) by 1489 days.

(21) Appl. No.: 14/470,794

(22) Filed: Aug. 27, 2014

(65) Prior Publication Data
US 2015/0060341 A1 Mar. 5, 2015

Related U.S. Application Data

(60) Provisional application No. 61/871,847, filed on Aug. 29, 2013.

(51) Int. Cl.
*B01D 33/70* (2006.01)
*B01D 33/04* (2006.01)
(Continued)

(52) U.S. Cl.
CPC ........... *B01D 33/705* (2013.01); *B01D 33/04* (2013.01); *B01D 33/11* (2013.01); *B01D 33/50* (2013.01); *B01D 33/763* (2013.01)

(58) Field of Classification Search
CPC ...... B01D 33/705; B01D 33/04; B01D 33/11; B01D 33/461; B01D 33/50; B01D 33/74; B01D 33/76; B01D 33/763; B01D 29/6476; B01D 33/067; B01D 33/073; B01D 33/41; B01D 33/466; B01D 2201/282; B01D 29/356; B01D 29/68; B01D 29/828; B01D 33/056; B01D 33/275; B01D 33/648; B01D 33/722; B01D 2201/02; B01D 2201/4046; B01D 2313/26; B01D 2315/06; B01D 2315/20; B01D 29/03; B01D 29/035;
(Continued)

(56) References Cited

U.S. PATENT DOCUMENTS 2,439,463 A * 4/1948 Gebauer ................ B01D 29/48
210/179
5,802,961 A * 9/1998 Hay ..................... A23B 7/0053
165/111
(Continued)

*Primary Examiner* — Bobby Ramdhanie
*Assistant Examiner* — Donovan Bui-Huynh
(74) *Attorney, Agent, or Firm* — Patent CEO; Phillip Vales

(57) ABSTRACT

A liquid solid separator tank has a motor driven recirculating belt having rollers placed therein processing a mixture of materials. The top belt brings wet materials into a collection trough having overflow weirs disposed externally. These weirs permit overflow liquids to flow down towards a main tank; then, a sump pump reintroduces water back into an influent basin to cleanse the mixture once again. Also, the action of a motor driven auger within the trough forces solids towards a dewatering box attached externally thereto. This box has a motor driven rotating cage mounted on moveable rollers and internally attached removable brushes that act to clean the outer surface of the cage as it moves in addition to a stationary high pressure wash. A shroud channels the influent liquid solid mixture towards a filtered water basin disposed directly underneath the lower belt portion permitting cleansed water to be removed therefrom.

9 Claims, 20 Drawing Sheets

(51) Int. Cl.
*B01D 33/76* (2006.01)
*B01D 33/50* (2006.01)
*B01D 33/11* (2006.01)

(58) Field of Classification Search
CPC .... B01D 29/118; B01D 29/445; B01D 29/48; B01D 29/56; B01D 29/60; B01D 29/6423; B01D 29/6484; B01D 29/94; B01D 33/042; B01D 33/463; B01D 33/503; B01D 33/807; B01D 35/16; B01D 35/18; B01D 36/04; B01D 37/00; B01D 37/03; B01D 37/04; B01D 61/18; B01D 61/22; B30B 9/12; B30B 9/127; B30B 9/125; A01K 1/0146; A01K 1/01; A01K 1/0103; A23L 3/185; A47J 37/1214; B04B 3/00; B07B 1/10; B07B 1/524; B07B 1/55; B08B 3/006; B08B 3/14; B29C 48/03; B29C 48/2735; B29C 48/694; C02F 11/123; C02F 1/004; C02F 2101/16; C02F 2203/006; C02F 2303/20; C02F 2303/24; C02F 3/1268; C02F 3/1273; C02F 3/201; C10G 73/36; F25C 1/04; Y02W 10/10; Y02W 10/15
See application file for complete search history.

(56) References Cited

U.S. PATENT DOCUMENTS

| | | | | |
|---|---|---|---|---|
| 5,832,873 | A | * | 11/1998 | Tu ................... A01K 1/0146 119/442 |
| 6,068,707 | A | * | 5/2000 | Magliocca ............ B01D 33/11 134/10 |
| 6,494,167 | B1 | * | 12/2002 | Chen ................... A01K 1/0103 119/479 |
| 6,615,710 | B1 | * | 9/2003 | Ishigaki ............... B01D 29/118 100/111 |
| 6,942,786 | B1 | | 9/2005 | Fosseng |
| 8,302,780 | B1 | | 11/2012 | Mitchell et al. |
| 2013/0213904 | A1 | * | 8/2013 | Mitchell ............... B01D 33/04 210/783 |

* cited by examiner

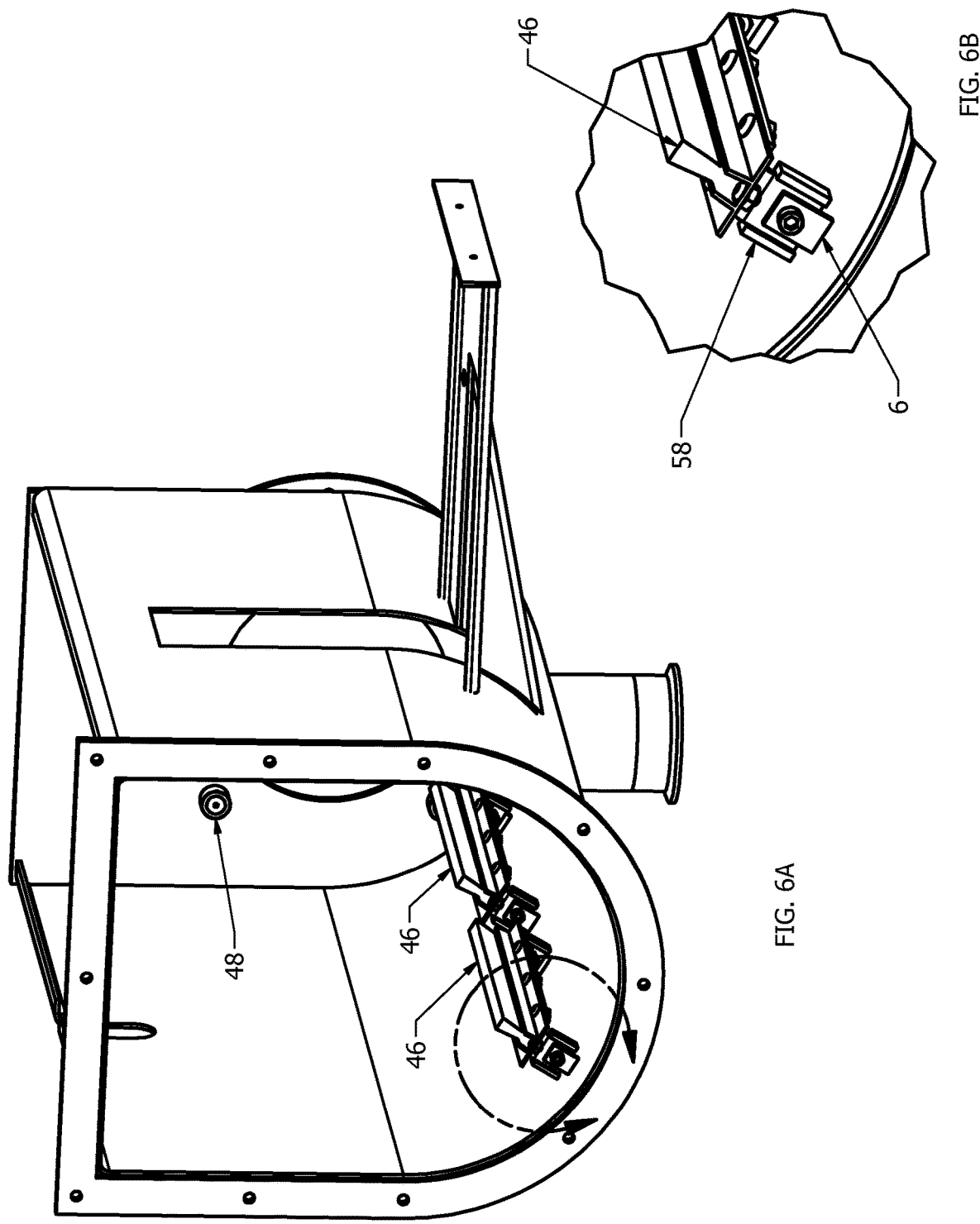

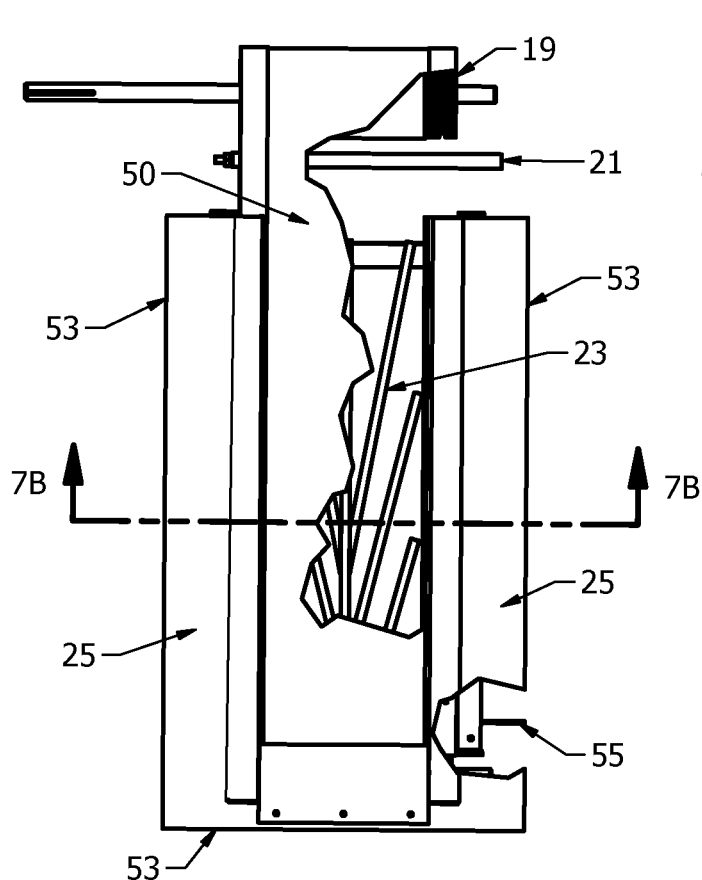
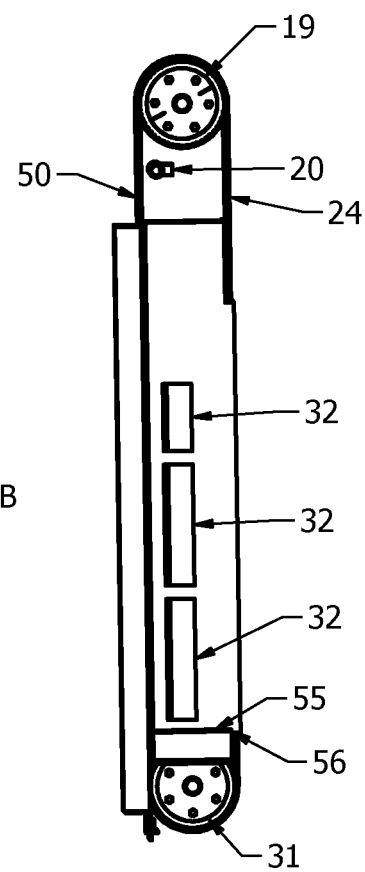
FIG. 7A
FIG. 7C
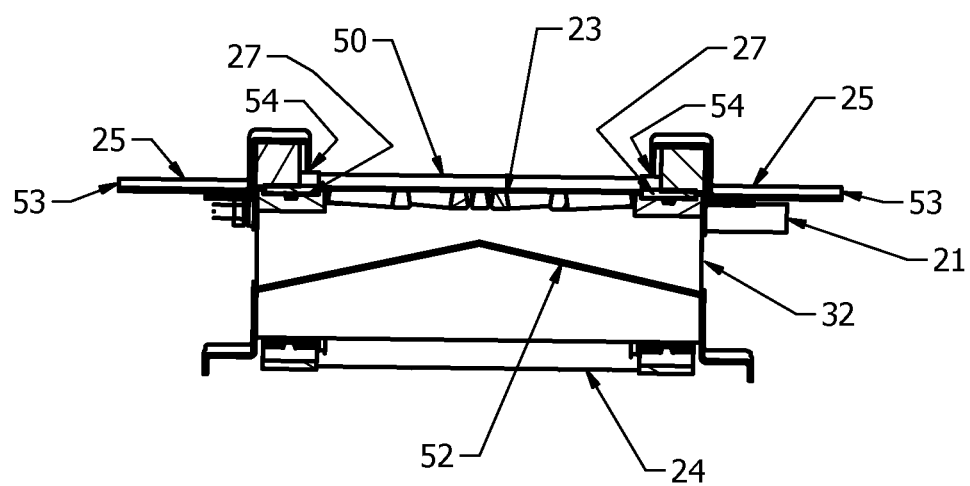
FIG. 7B

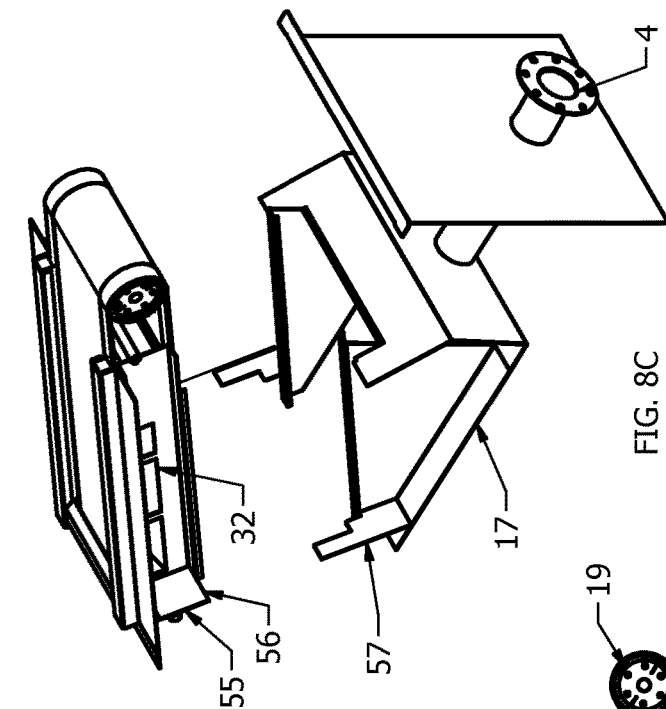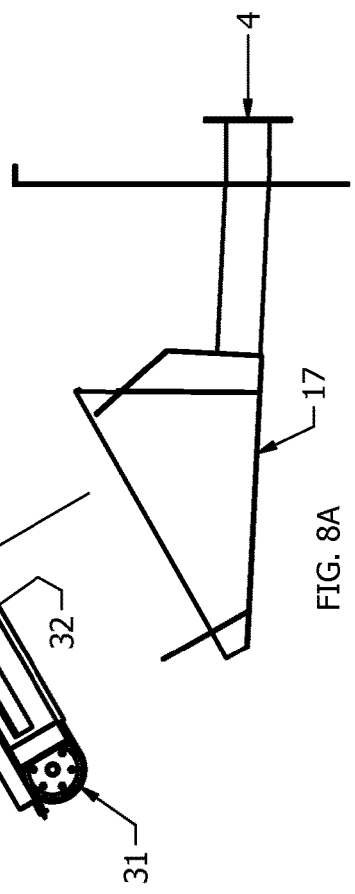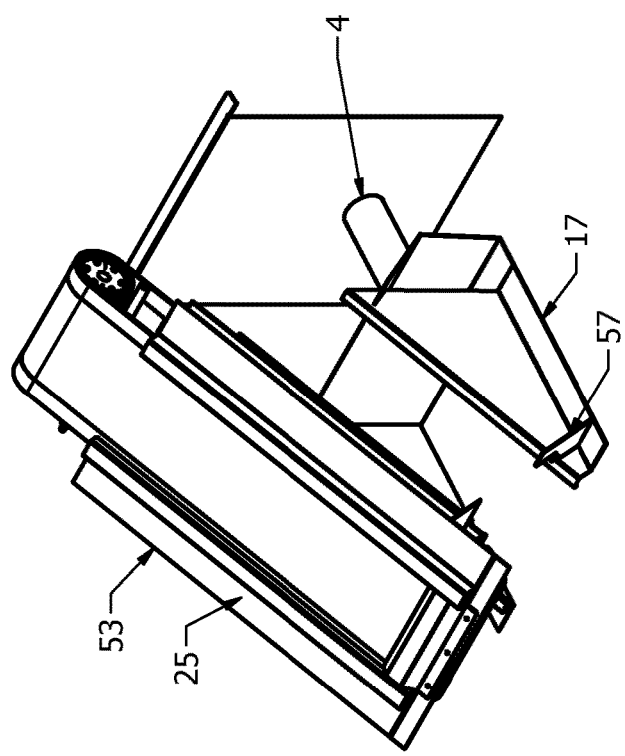

LIQUID SOLID SEPARATOR

CROSS REFERENCE TO RELATED APPLICATION

This application claims benefit of previously filed U.S. Provisional Patent Application No. 61/871,847 filed on Aug. 29, 2014.

FIELD OF THE INVENTION

The invention herein described relates to devices for the separation of solids from liquids. More particularly, this invention relates to tank devices having a motor driven recirculating belt utilized to filter solid matter from a liquid mixture having said solid matter therein.

BACKGROUND OF THE INVENTION

United States Patents

U.S. Pat. No. 6,942,786 awarded on Sep. 13, 2005 to Fosseng and U.S. Pat. No. 8,302,780 granted to Mitchell et al. on Nov. 6, 2012 are herein incorporated by reference. In particular, Fosseng teaches: a continuous filter belt guided through a container for filtering water; a screw conveyor to collect and remove residue dislodged from the filter belt; a transmission belt that drives the filter media; a guide rail constructed of polyethylene fastened to a steel rail for guiding the filter belt edges; a control device to adapt the belt movement thus keeping the waste water surface below a certain set point; that the edges of the filter belt covered by a tight cover band pressed downwards by a soft elastic pressure lip, hence minimizing the liquids that can pass around the belt versus going thru the belt; a spring loaded door at the solids outlet to restrict solids flow and further compress the solid cake; and a water spray for further cleaning the filter belt.

Mitchell teaches: a spray wash for cleaning the filter belt; directing filtered water via the use of dams and baffles into sealed alleys away from the return belt to prevent carry-over contamination from the return belt; using a booster pump for the spray wash; the use of a diverter panel to reduce kinetic energy and physical impact to the filter media; the use of an additional scraper bar after the spray wash that directs liquid run-off in the collection trough; and the use of brushes on the auger flight tips in the cage section of the dewatering section to continuously clean the openings of the cage to allow constant water drainage.

These patents have commonality in that they comprise a continuous rotating belt filter where liquids are brought into a tank, flow thru the filter belt and out of the tank as a filtered liquid effluent. The filter belt is constructed of a fine mesh fabric that has edges that interface with a drive pulley that drives the mesh fabric like a conveyor belt. The filter belt is inclined where captured solid residue remains on the belt as liquid passes thru and is conveyed above the liquid level in the tank, cleaned from the belt and captured in an auger collection trough where it is then conveyed to a screw press where its compressed, dewatered and discharged from the machine in a semi-dried cake form. The screw press consist of a slotted cylindrical cage (commonly called a wedge wire cage in industry) and a restriction at the discharge (in these cases a spring loaded door) which causes the debris to compress and squeeze out water that escapes thru the wedge wire cage slots.

Differences Between Fosseng & Mitchell:

The prior art Fosseng patent design removes the residue from the belt via compressed air. An air knife is located on the back side of the belt and blows air thru the belt and thereby blows the residue into the collection trough. The prior art Mitchell patent improves on the Fosseng design by changing the belt cleaning method to a water wash; this significantly improves the ability to actually clean and fully clear the fine pores of the mesh belt. By using a water wash, the apparatus can operate in harsher heavier applications because of the improved cleaning efficiency. It is important to note that the screw press as configured in the Fosseng design would likely not be able to handle the increased water volume in the solids collection section. Once the collection trough becomes flooded, it loses its ability to properly convey material. Thus, there needs to be some solution to this problem.

The Mitchell design additionally improves the screw press by adding brushes to the screw flights and by adding a secondary drain to the opposing end of the auger screw to drain off excess liquids. Adding brushes to the auger flights is common in industry and is used in similar screw press machines because the brushes tend to force out debris that would otherwise clog the wedge wire cage. The auger screw acts as an Archimedes screw and actually conveys or pumps water (and solid debris) toward the wedge wire cage. During proper operation there will be no water at the opposing end of the screw.

However when the machine experiences a high load, liquid levels rise in the trough because it can't drain the liquid thru the wedge wire cage slots fast enough. Once the level is higher than the mid point of the auger screw (since the screw is in an open trough) the liquid begins to flow around the auger flights. As a result, liquid begins to flow towards the opposite end of the auger (opposite the conveyance direction). This is the last place that the liquid gets to before it begins to completely flood the trough. By putting a drain at the far end, it ensures that the auger trough can never be completely flooded and therefore this feature is what makes the water wash possible on this design.

Another fundamental difference between the Fosseng design and the Mitchell design is how the return belt is isolated from the liquid effluents. This is mentioned in the Mitchell patent but the function may not be clear. In the Mitchell design, liquids are directed away from the return belt and are collected in side alleys using a diverter panel mounted on a frame. Basically there is an upper and lower belt and the filtered liquid is directed out the side of the conveyor and never comes in contact with the lower return belt because a diverter panel 170 mounted on the frame holding the rollers causes the liquid to avoid the belt; the panel is a dual angled slab for diverting liquids to either side of a central point. This prevents residue that isn't cleaned from the belt (referred to as carry over) from re-contaminating the liquid effluent which is what happens in the Fosseng design. However, isolating the return belt creates another problem of conveyor leakage around the conveyor seals. In the Mitchell design, this conveyor leakage ends up being drained to the reject line.

Other Problems

The opposing drain creates an unpredictable reject stream that provides a way if the wedge wire screen becomes fouled to allow all of the collected solids to escape the machine thru the secondary drain. In both Fosseng and Mitchell design, there is a reject stream that exits the machines via a pipe. In the Fosseng design, the liquid reject stream coming from the wedge wire cage makes up the reject stream. In the Mitchell design, liquid reject from the wedge wire cage, the secondary drain and the conveyor leakage make up the reject stream. Thus, there should be some way of reducing or eliminating this reject stream.

GENERAL PRIOR ART CONCEPT

Screens are routinely used in industry to filter and separate solids from liquids. In order for fine screens to effectively remove solids from a liquid, the screen must constantly be cleaned in order to prevent fouling. Several prior inventions teach how to move liquids thru a moving belt that is continuously cleaned; in particular, the prior art teaches an inclined belt whereby liquids are introduced above a rotating filter belt. The debris is then carried out of a liquid bath where the filter media is cleaned using a variety of methods. To complete the separation of the solid, belt presses are disposed in proximity to the belt so that they can dewater the sludge mixtures; this system has been common for a number of years.

In some prior art cleaning is accomplished by medium pressure air blowing debris from the screen; some use scraper blades that scrap debris from the screens. The prior art also teaches the use of a screw press; however, screw press cages often become clogged with debris and typically require manual cleaning on a routine basis; a difficulty that has been not overcome. Thus, a user would have to stop the ordinary operation of the device, gain access to the working portion of the press which may require even disassembling components therein. All of this takes up valuable time that would be better utilized should a solution to these problems be found.

Additionally, in these processes, keeping the filter media clean is critical to proper operation; however, the prior art typically does not maintain a clean set of equipment that are being used in the filtration nor does it constantly have a clean filter media utilized to clean the sludge or other material being cleansed. Further, any solution should significantly reduce the need for routine maintenance. Accordingly, there needs to be some solutions to overcome the aforementioned problems discussed above.

SUMMARY OF THE INVENTION

The present invention overcomes the deficiencies of the known art and the problems that remain unsolved by providing A liquid solid separator comprising: a container circumscribing an enclosed space closed at its bottom portion and open at its top portion having an inlet for supplying a liquid solid mixture to be separated to an influent basin region above a recirculating filter belt: the recirculating filter belt associated with the container such that the recirculating filter belt is disposed on supports associated with the container; wherein the recirculating filter belt receives the liquid solid mixture and transports the liquid solid mixture to a collector attached to the container and disposed proximal to the recirculating filter belt; wherein said collector has a recirculation overflow weir and such that the recirculation overflow weir drains directly to a lower reject stream recirculation basin: a dewatering box attached to the outside of the container and has a dewatering drain associated therewith; a dewatering rotatable cage moveably associated within the dewatering box and located adjacent to the collector, wherein said dewatering rotatable cage has a space therein and receives the liquid solid mixture from the collector; a motor driven auger associated with the container and disposed nearby the recirculating filter belt and within the collector and within the dewatering rotatable cage; such that the motor driven auger expels solids out of the container from the liquid solid mixture received at the inlet that has then been transported on the recirculating filter belt, through the collector, and into the dewatering rotatable cage within the dewatering box; the lower reject stream recirculation basin situated below the collector and formed from inner surfaces of a lower portion of the container such that the lower reject stream recirculation basin receives a reject stream from the recirculating belt, from the collector, and from the dewatering box; a filtered water collection basin attached internally to the container and underneath the recirculating filter belt as well as disposed directly above the lower reject stream recirculation basin and is connected to a liquid outlet; wherein the filtered water collection basin receives filtered liquids from the liquid solid mixture that have passed through the recirculating filter belt, and transports the filtered liquids through the liquid outlet; a recirculation conduit connected to a reject stream recirculation pump located in the lower recirculation basin and wherein the recirculation conduit is directed to a point in the container above the influent basin region above the recirculating filter belt.

In another aspect, wherein the collector further comprises: a second recirculation overflow weir on the collector.

In another aspect, further comprising: a plurality of recirculation overflow weirs that includes the first recirculation control overflow weir on the collector.

In another aspect, wherein the dewatering box further comprises: a rotatable cage spray wash device located and proximal to the rotatable cage and physically supported by the container.

In another aspect, wherein the dewatering box attached to the container further comprises: a stationary brush mount attached to an inner surface of the dewatering box and external to the rotatable cage associated with the dewatering vessel; and further having a brush mounted within the stationary brush mount wherein the brush impacts an external surface of the rotatable cage.

In another aspect, further comprising: a spray wash device associated with the dewatering box; and a belt wash system located near the recirculating filter belt.

In another aspect, wherein the plurality of recirculation overflow weirs on the collector are graduated in size as they proceed down a side of the collector.

In another aspect, further comprising: wherein the plurality of recirculation overflow weirs on the collector are graduated in size as they proceed down the side of the collector such that they are larger farther from the dewatering box and smaller closer to the dewatering box.

In another aspect, further comprising: a cage spray wash device located proximal to the dewatering rotatable cage and physically supported by the container; a brush mounted to an inner surface of the dewatering box; and a belt wash system located near the recirculating filter belt.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 6A presents an isometric view of the dewatering box with a side panel removed therefrom.

FIG. 6B presents a closeup view of the brushes utilized to clean the external surface of the wire cage.

FIG. 7A present a conveyor plan view with belt and shroud breakout sections.

FIG. 7B presents a section view of belt conveyor.

FIG. 7C presents a side view of a conveyor portion showing rollers, exit windows 32 and more.

FIG. 8A presents an exploded Side view of Conveyor and Internal Collection Tank and back wall of main tank.

FIG. 8B presents an exploded Front Right Isometric view of Conveyor and Internal Collection Tank and back wall of main tank.

FIG. 8C presents an Exploded Rear Right Isometric view of Conveyor and Internal Collection Tank and back wall of main tank.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word exemplary or illustrative means serving as an example, instance, or illustration. Any implementation described herein as exemplary or illustrative is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms upper, lower, left, rear, right, front, vertical, horizontal, and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
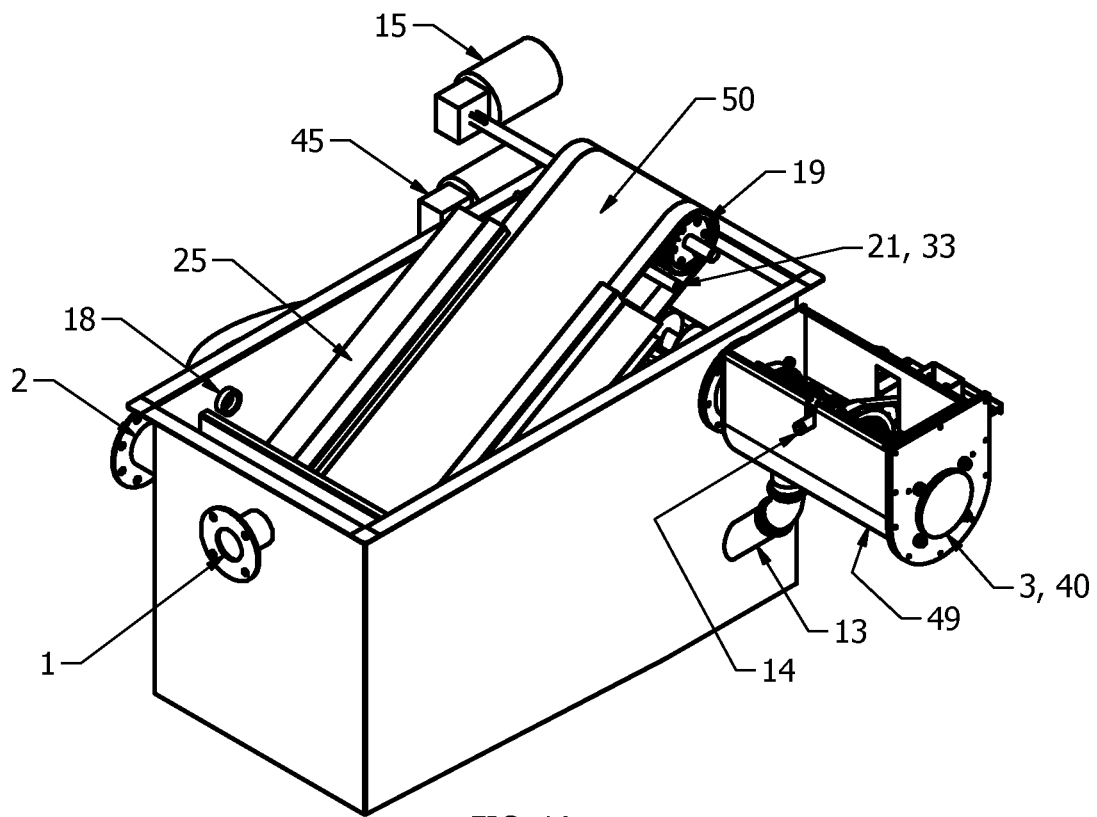
FIG. 1A presents a front right side isometric view in an embodiment of the Liquid Solid Separator.

FIG. 1A presents a front right side isometric view in an embodiment of the Liquid Solid Separator. A liquid solid separator has many components as described below, however, this list is not meant to be all inclusive as these only serve to provide support to the main features of the invention as detailed further below. The general overall operation of the device follows the basic name thereof; since this is a solid liquid separator it should be understood that solids and liquids are provided into a box or tank using various inlets and separated using several devices therein.

As such, it should be understood that a separator is formed from a tank having four walls and a bottom wall integrated in a box shape with a large opening at top opposite the bottom wall. Thus, two large rectangular walls one on the right and one on the left, are welded to two smaller rectangular or square walls one in front and one in back, along respective vertical walls of the aforementioned. Finally, bottom edges of the walls are welded to corresponding edges of the bottom wall; in this fashion a box or 'tank' shape is formed for the containment of liquids and solids therein and for their separation as described herein; these two are to be used interchangeably in this disclosure to described the basic rectangular container. Various other devices and structures are described below forming the various features of the separator.

The first of these is a pipe inlet 1 formed of a circular pipe having a flanged lip for attachment of further ducts or piping using bolt-nut combinations using holes in the flange; this inlet is situated at the front rectangular wall and provides the raw material having a mixture of liquids and solids into the main body of the tank. A similar flanged pipe forms an overflow outlet 2 on the left side of the tank towards the rear thereof. The overall device is used to remove solids from liquids as its name would suggest; an outlet 3 shaped as a circular hole is cutout of one end of a dewatering box 49 that is attached to the right wall of the tank near the rear end thereof; it is attached using a dual ended circular flanged intermediate pipe. This dewatering box 49 is shaped as a smaller rectangular box that at a predefined point on either longitudinal side tapers to a rounded half circular shape; the box itself does not have a top portion for easy access and maintenance.

On the left side of the dewatering box 49 is dewatering drain 13 that empties back into the main tank formed from a pipe that is welded to a hole in the bottom thereof and that is welded to the side of the tank. Finally, a cage wash supply line 14 is a pipe that provides water or other liquids into the dewatering box to clarify the materials that have been placed into the box. This supply line 14 is welded or passed within a hole in a longitudinal side of the dewatering box 49. On the opposite side of the dewatering box 49 is an electric auger drive motor 45 driving an auger 28 that rotates within a collection trough 44 and passes through the intermediate dual flanges pipe and on into the dewatering box 49 rotating within but not impacting a cage therein; this drive motor 45 is mounted to the external left side of the tank or using a standalone structure. An upper filter belt 50 driven by belt drive electric motor 15 brings wet solid matter to a height and position whereby it can be deposited into the collection trough 44 as the upper filter belt 50 goes about upper drive roller 19 and its associated sprockets; it should be understood that the motor 15 is mounted to the tank and the roller/sprockets 19 are similarly attached to suitable support for causing the rotation opposite the motor 15.

Directly between the upper filter belt 50 and the lower filter belt 24 near the roller/sprocket 19 is a belt wash pipe inlet connection 21; this pipe brings water or other liquids from other piping not shown so as to clean the belt using a belt wash spray wand 33 and its associated belt wash spray nozzles 20 that is attached to the connection 21. The upper filter belt 50 further has a U shaped conveyor shroud 25 sitting atop the forward lowered portion of the belt 50 that has a narrow mouth permitting liquids to pass into the belt 50 to be filtered thereby; as liquids arrive in the influent tank 36 from inlet 1 they are contained between the forward, right and left walls of the tank as well as the conveyor shroud 25; thus, the only outlet is within the center of the 'U' of the shroud thereby permitting liquids to flow there through. The shroud also guides the belt so as to prevent excessive motion of the belt 50 as it transits about the rollers/sprockets 19; this shroud 25 is disposed atop the conveyor belt system as follows.

The shroud has a rubber edging around the three external sides of the perimeter of the shroud where the shroud contacts the tank wall 53. The rubber edge is squeezed between the tank wall and the shroud to make a seal. On the inside of the shroud, where the shroud covers the belt, there is also a rubber seal that lightly contacts the belt on three inner sides 54 thereof. In this fashion, the shroud 25 forces a liquid mixture to flow through the belt thereby filtering it. A pump outlet pipe 18 situated on the left side of the tank above and to the side of the overflow outlet 2 provides materials to an influent tank 36 from sump pump found in a lower collection basin and shown in another figure.

Figure 1B:
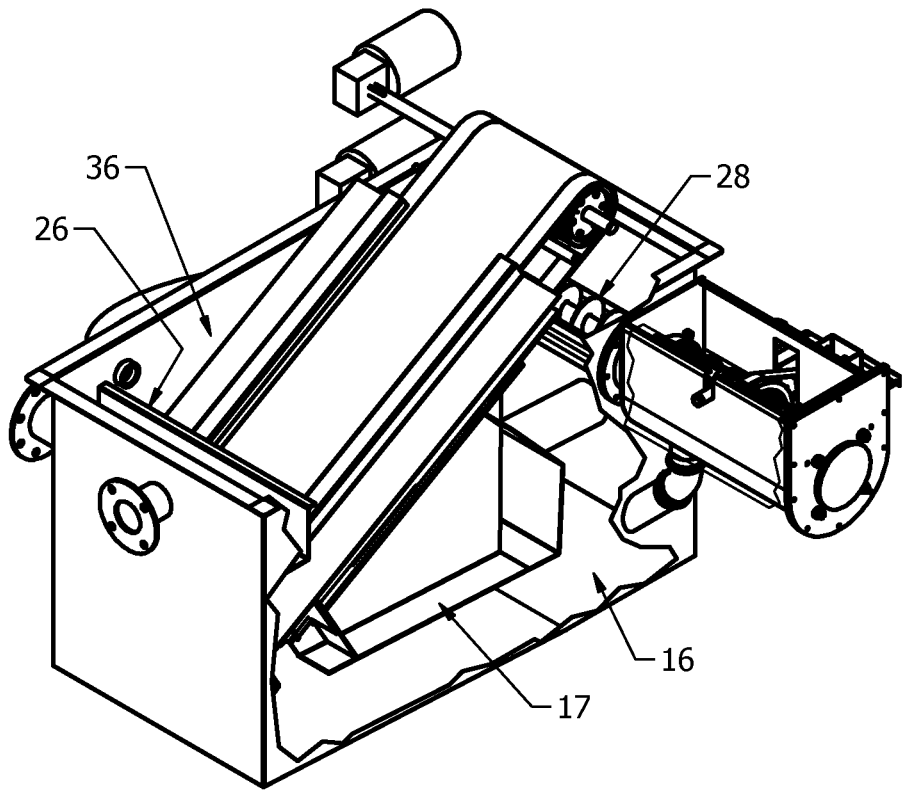
FIG. 1B presents a front right side isometric view in an embodiment of the Liquid Solid Separator with a right panel breakout.

FIG. 1B presents a front right side isometric view in an embodiment of the Liquid Solid Separator with a right panel breakout. An overflow L shaped overflow weir 26 is welded to the inside front face of the tank such that L is reversed whereby the lower leg portion thereof is attached thereto and the upper vertical portion forms a weir controlling the level within the tank; further, this weir creates an overflow shelf at the forward portion of the tank. The inlet 1 is also located in the same general area, however as shown in later figures, the inlet directs influent liquids under the overflow shelf via a welded diffuser therefore only allowing overflow liquids from the influent section of the tank to enter the overflow shelf. The pump inlet 18 is located above the influent basin 36 therefore it should not be confused that the pump outlet goes to the influent basin and not the overflow shelf. An archimedes screw type collection auger 28 driven by auger drive motor 45 is rotated within a collection trough 44 (and the cage dewatering box 49) situated within and attached to the inner rear surface of the tank and the right and left inner surfaces of the right and left side walls thereof. The trough 44 and collection auger 28 receives materials deposited by the upper filter belt 50 just above the trough 44 and auger 28; the rotation of the auger caused by drive motor 45 forces materials to the right for removal of solid matter.

A lower collection basin tank 16 receives liquids and other matters from dewatering drain 13, overflow from trough 44 and its associated weirs 30 and excess materials from lower belt 24. A filtered water collection tank 17 is welded to the inside walls of the tank walls and is directly situated underneath the lower belt 24 forming a U shaped collection area that permits filtered water to exit via outlet 4; two mirror sub basins are disposed opposite to one another forming legs of the U and where the legs meet is where an integral connection is made to outlet pipe 4 thereby permitting the outflow therethrough. A diverter panel 52 (such as 170 in the prior art) is attached to a support frame and has outlet exit windows 32 that empty into each sub-basin.

Figure 1C:
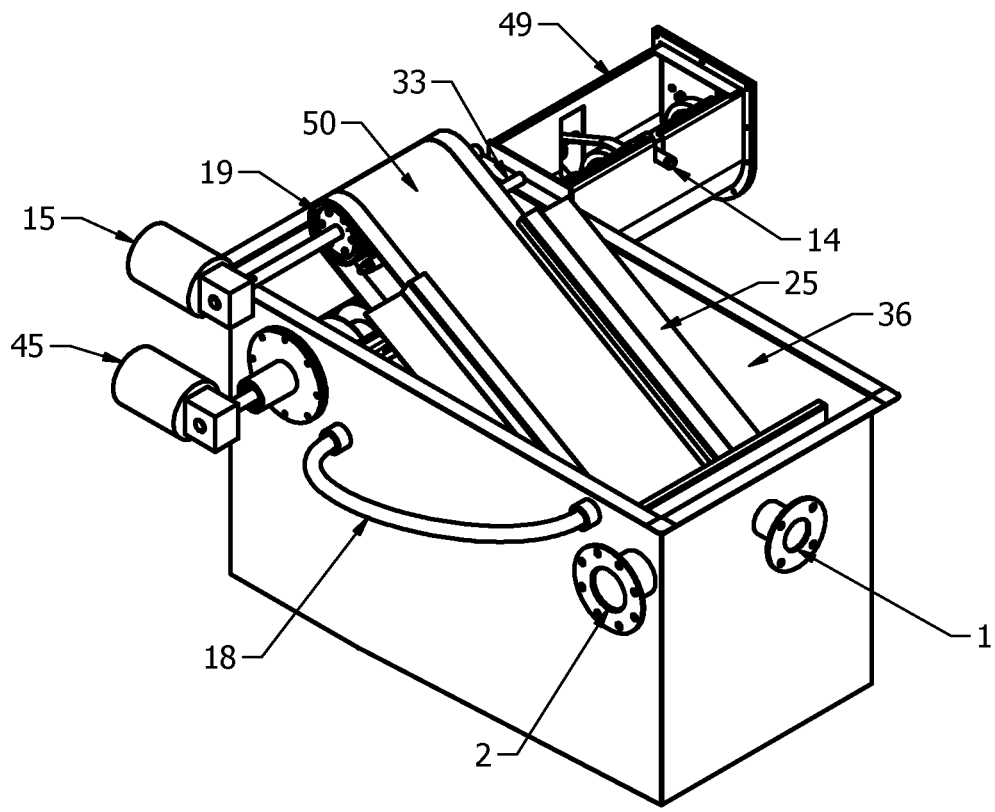
FIG. 1C presents a front left side isometric view in an embodiment of the Liquid Solid Separator.

FIG. 1C presents a front left side isometric view in an embodiment of the Liquid Solid Separator. In this view it is apparent that the auger drive motor 45 has an armature that rotates upon bearings using a flanged connector 9.

Figure 1D:
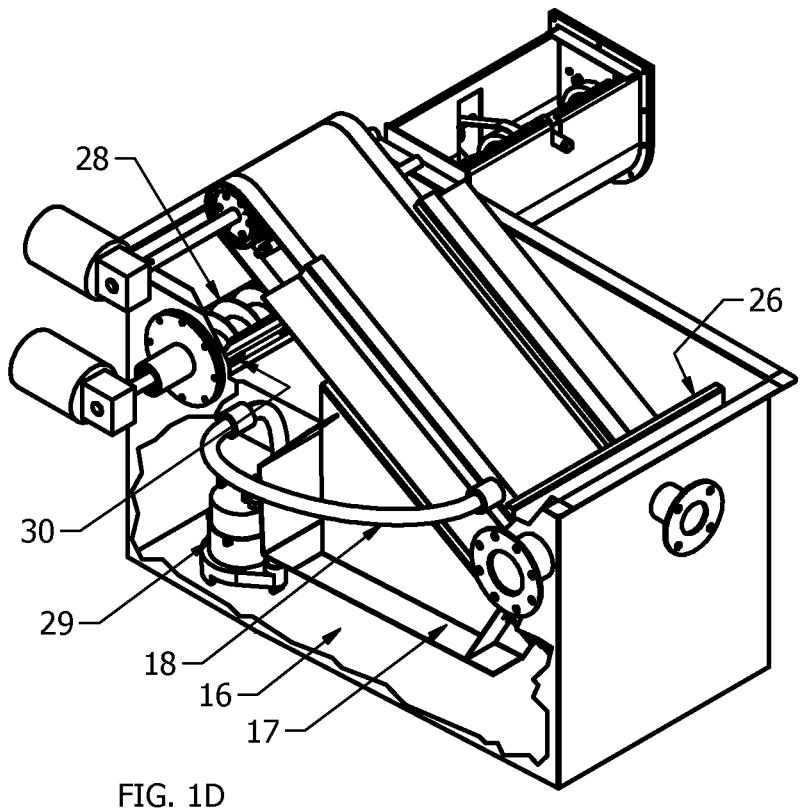
FIG. 1D presents a front left side isometric view in an embodiment of the Liquid Solid Separator with a left panel breakout.

FIG. 1D presents a front left side isometric view in an embodiment of the Liquid Solid Separator with a left panel breakout. A collection basin sump pump 29 pumps liquid matter from the collection basin using pump outlet pipe 18 back up above the lower portion of the belt 50 and into an influent collection basin 36 or 'tank'. A lower collection basin tank 16 receives liquids and other matters from dewatering drain 13, overflow from trough 44 and its associated weirs 30 and excess materials from lower belt 24. A filtered water collection tank 17 is welded to the inside walls of the tank walls and is directly situated underneath the lower belt 24 forming a U shaped collection area that permits filtered water to exit via outlet 4; two mirror sub basins are disposed opposite to one another forming legs of the U and where the legs meet is where an integral connection is made to outlet pipe 4 thereby permitting the outflow therethrough.

Figure 1E:
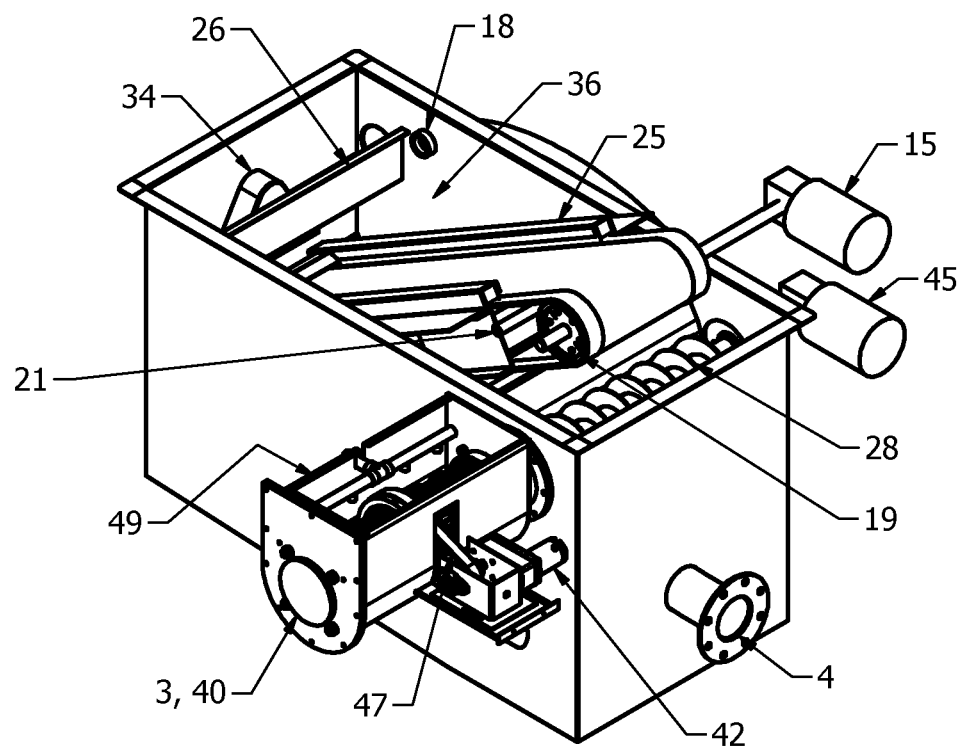
FIG. 1E presents a rear right side isometric view in an embodiment of the Liquid Solid Separator.

FIG. 1E presents a rear right side isometric view in an embodiment of the Liquid Solid Separator. An inlet diffuser 34 is a triangular device attached to the inner surface of the front of the tank; the diffuser is a welded enclosure having an entrance from inlet pipe 1 and a larger exit below the overflow shelf, therefore directing influent under the overflow shelf; this inlet diffuser slows incoming liquids by increasing the inlet area in order to reduce the force of incoming liquids on the belt. A motor 15 is attached to the right wall of the tank near the rear thereof for driving roller and sprocket 19 and the associated upper belt 50. A liquid outlet 4 is a flanged pipe welded to the outer surface of the rear wall of the tank for allowing liquids to flow out therefrom. A belt drive electric motor 42 is attached or mounted to both the rear outside portion of the dewatering box 49. A hole in the rear portion of the dewatering box permits entry of the belt 47 from the belt drive motor into the space formed by the dewatering box for wrapping the aforementioned about an appropriate portion of a rotating dewatering cage 39.

Figure 1F:
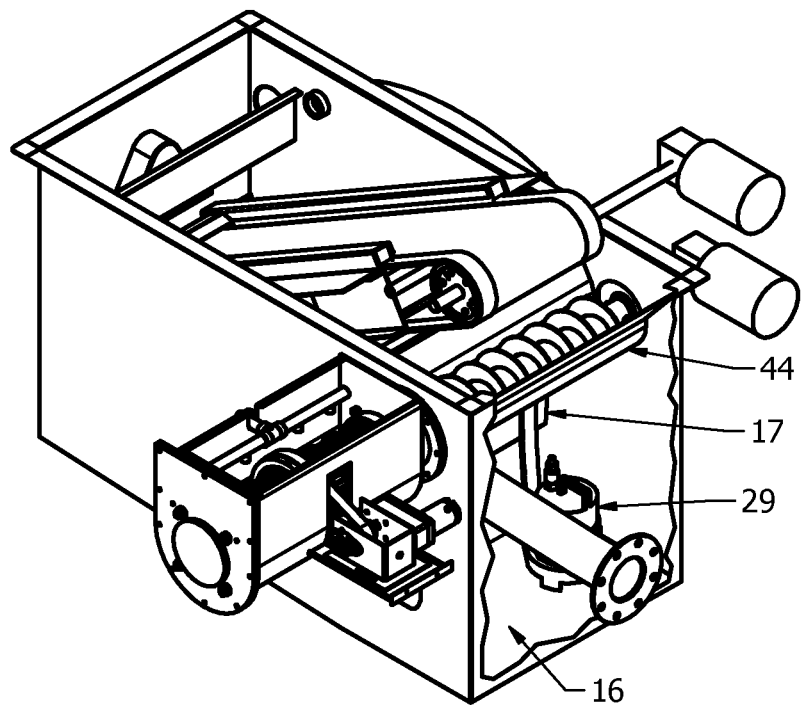
FIG. 1F presents a rear right side isometric view in an embodiment of the Liquid Solid Separator with a rear panel breakout.

FIG. 1F presents a rear right side isometric view in an embodiment of the Liquid Solid Separator with a rear panel breakout.

Figure 1G:
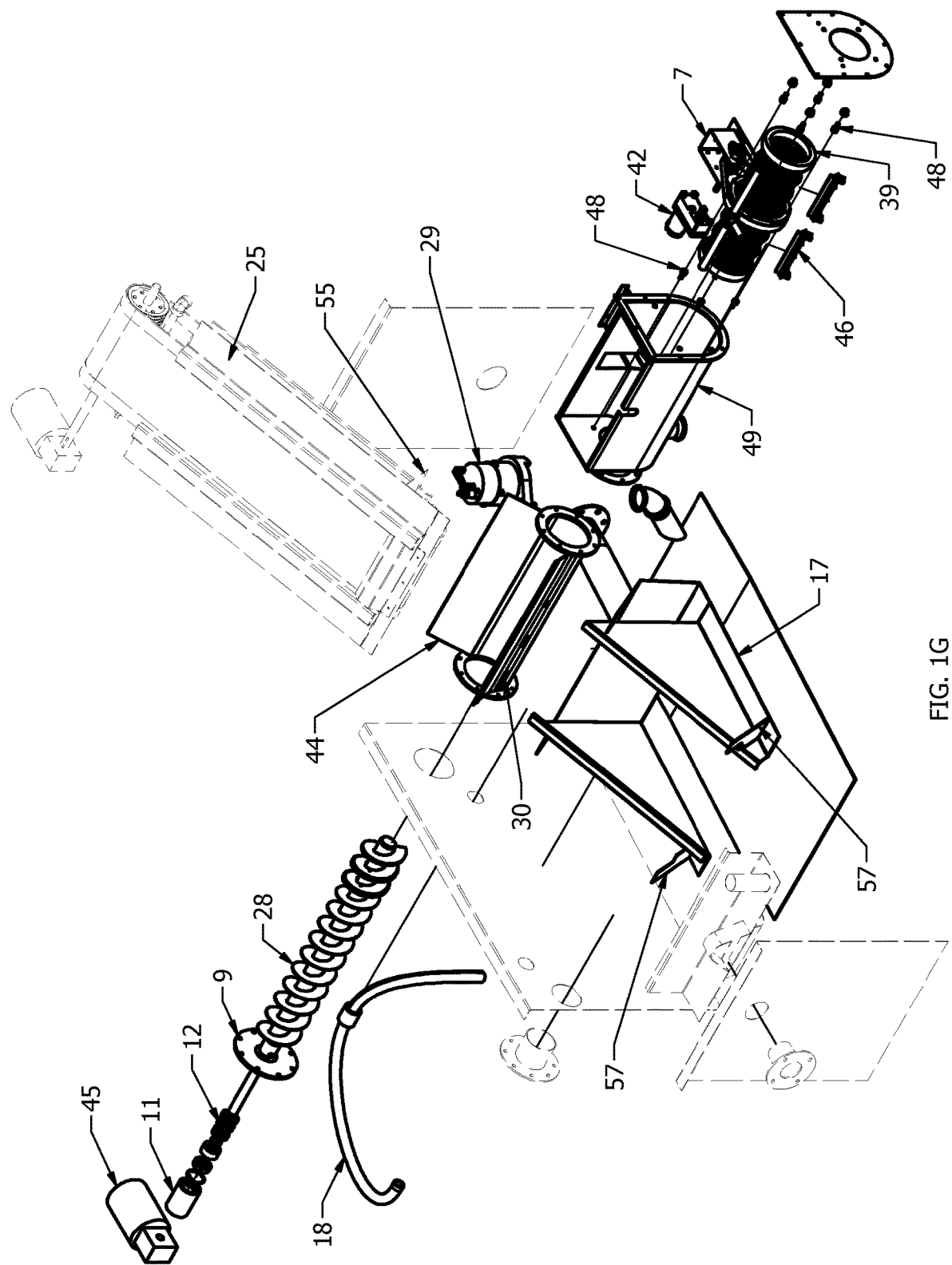
FIG. 1G presents an exploded view of various components internal components of the Liquid Solid Separator in an embodiment.

FIG. 1G presents an exploded view of various components internal components of the Liquid Solid Separator in an embodiment. An electric motor 45 is attached via an armature to the auger 28 that has circular center bearings. The auger screw is cantilevered as all the bearings are at the motor side; its bearing pack 12 is made up of two radial bearings and a thrust bearing; these are installed and contained in a machined bearing housing 11 that is welded to the auger flange 9. It should be appreciated that the auger has a sacrificial liner inside of the trough 44 directly under the auger that protects the inner surface thereof. Thus, the rotation of the auger can be effected through this hole using the motor 45 and armature integrally attached to the auger 28. It is this device that rotating in a collection trough 44 (and on through cage 39 in box 49) causes solid matter to gather about the edge of its blade thereby forcing it to right side of the tank.

The collection trough 44 itself is a longitudinal semicircular device that ends in two tangential wings at an approximate end of the semicircle on either longitudinal side of the trough thereof. Either end of the trough 44 has a circular connection flange connected thereto that is bolted onto the periphery of holes in the right and left walls of the tank that have appropriate attachment points. A dewatering box 49 is attached to the tank and external thereto as described previously. Within this box 49 is a dewatering cage 39 that rotates using a belt drive motor 42 having a cage drive mechanism 43 and belt 47 passing through a slot in the box 49 to the motor attached to a side thereof a series of small track rollers serve to provide rotational support to both ends of the cage on both ends of the inner surface of the dewatering box. Two cage external brushes 46 serve to scrape the wire mesh of the cage thereby removing solids therefrom.

Figure 1H:
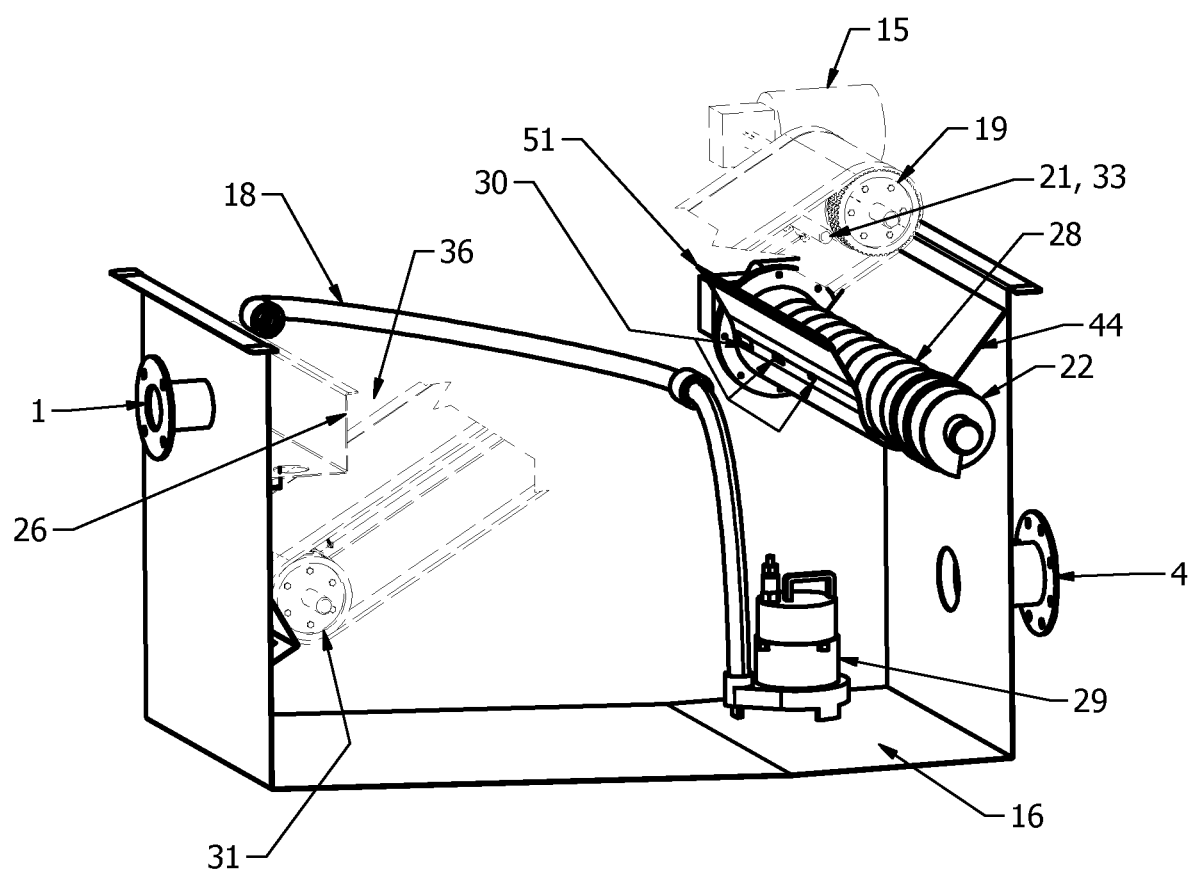
FIG. 1H presents a right side view of the tank showing a conveyor breakout with only the front and rear walls such that the side walls and filtered water collection basin removed from the figure in an embodiment.

FIG. 1H presents a right side view of the tank with break out conveyor having only the front and rear walls with the right and left side walls removed from the figure in an embodiment; the internal filtered water collection tank is omitted for clarity. A lower slave roller 31 and sprockets operates in union with the upper drive roller having sprockets to move the belt 50 upwards and the lower belt 24 downwards thereby causing motion of the solid liquid matter therein. It should be understood that the upper 19 and lower rollers 31 have axial support for the sprockets as they are attached rotationally to a support frame of the overall conveyor system as typically arranged; the support frame is not shown for simplicity.

Next, two groups of three overflow weirs 30 are arranged longitudinally such that each group is located on a side of the collection trough 44; the position of the weirs 30 is such that they are sequentially disposed one after the other in a symmetric pattern; in the drawing they are larger farther from the dewatering box and smaller as they approach the same, however, they could be same size, could be located at different elevations, and even be located on both sides of the collection trough, instead of just one side like shown in the drawings. These weirs 30 are essentially slots or perforations in the side of the trough 44 that permit fluid and other matter to seep out therethrough and into lower collection basin tank 16 where they may be acted upon by sump pump 16 that redirects the flow back to the front of the belt system or just in the vicinity of the lower slave roller 31. The collection trough itself has a wiper blade 51 located on the end of the wing of the collection trough 44 nearest the lower belt; these are either rubber or metal strips having a longitudinal slot on the thicker side for sliding the aforementioned on the edge of the forward wing nearest the lower belt for impacting that lower belt and cleaning any gross residue off of it.

Figure 2A:
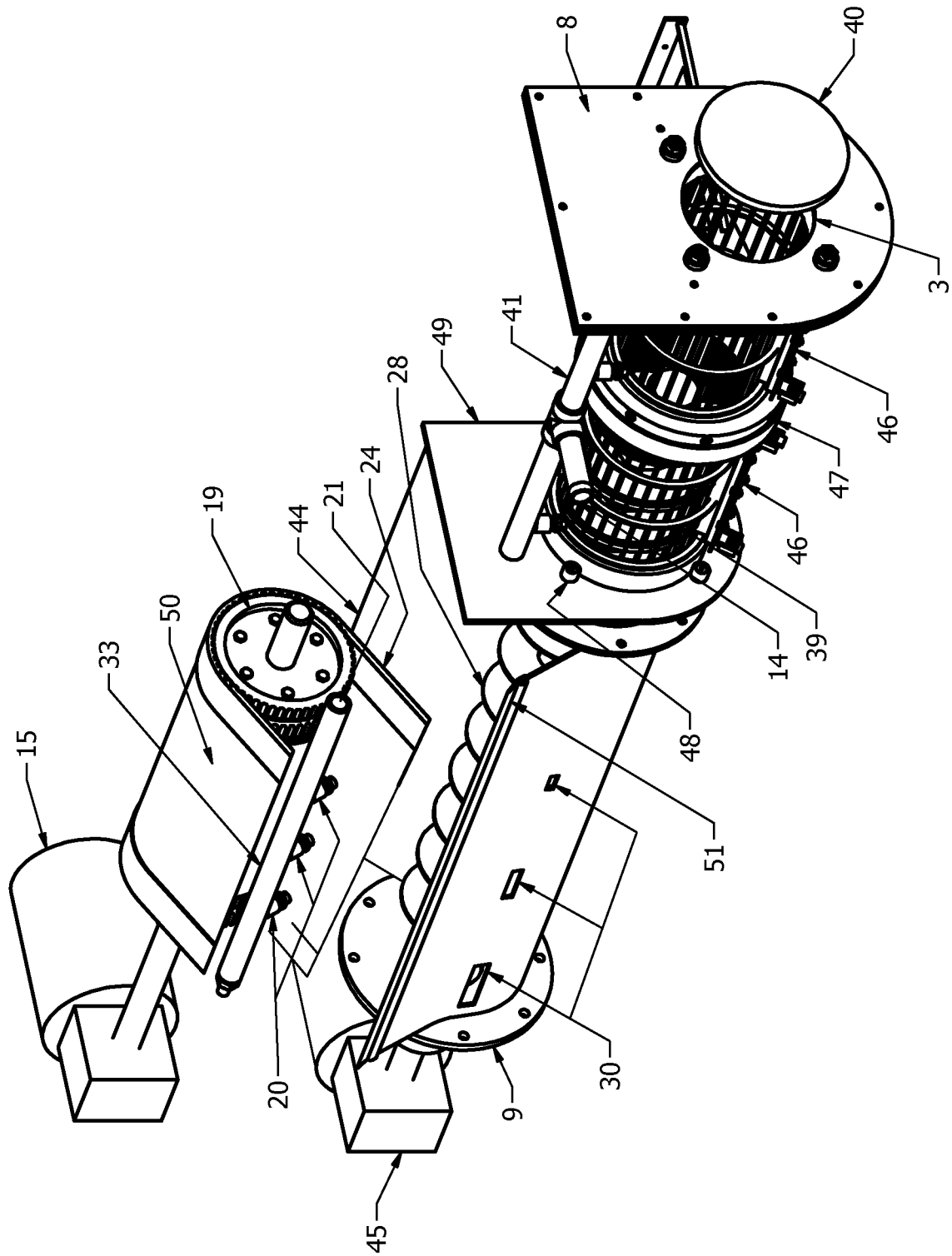
FIG. 2A presents a forward isometric view of the belt cleaning and solid collection system in an embodiment.

FIG. 2A presents a forward isometric view of the belt cleaning and solid collection system in an embodiment. Directly between the upper filter belt 50 and the lower filter belt 24 near the roller/sprocket 19 is a belt wash pipe inlet connection 21; this pipe connection brings water or other liquids from other piping not shown so as to clean the belt using a belt wash spray wand 33 (section having nozzles 20 connected thereto) and its associated belt wash spray nozzles 20 that is attached to the connection 21.

Next, two groups of three overflow weirs 30 are arranged longitudinally such that each group is located on a side of the collection trough 44; the position of the weirs 30 is such that they are sequentially disposed one after the other in a symmetric pattern. The weirs themselves are preferably larger closer to the motor 45 that rotates the auger 28 and smaller towards the end thereof; this because the operational flow of the machine progresses solids towards the dewatering box. Thus, more solids as a percentage of material are found near the dewatering box and conversely there must be more liquid present in the trough away from the dewatering box; as a result, the weirs 30 need to evacuate more fluid where the weirs are larger and less where the weirs are smaller as the overflow rate of liquid is less where solids predominate. In ordinary operation, the screw pushes liquids away from the motor, so that there should not be a significant liquid level near the motor. There are however, liquids always near the exit since liquids are being pumped there; therefore, typically this is not an area of concern. If liquids do buildup near the motor this indicates an upset and the need for fast draining of the trough to return operation to normal.

These weirs 30 are essentially slots or perforations in the side of the trough 44 that permit fluid and other matter to seep out therethrough and into lower collection basin tank 16 where they may be acted upon by sump pump 16 that redirects the flow back to the front of the belt system or just in the vicinity of the lower slave roller 31. The collection trough itself has a wiper blade 51 located on the end of the forward wing of the trough 44 nearest the lower belt portion of the recirculating conveyor belt as previously described; these are either rubber or metal strips having a longitudinal slot on the thicker side for sliding the aforementioned onto the edge of the wing.

The overall device is used to remove solids from liquids as its name would suggest; at an outlet 3 shaped as a circular hole is cutout of one end of a dewatering box 49 that is attached to the right wall of the tank near the rear end thereof; it is attached (welded, bolted) using a dual ended circular flanged intermediate pipe having one flange to the tank and one flange to the dewatering box; the box 49 also has aright wall 8 a bolted with a gasketed cover that is removable in order to remove the wire cage. This dewatering box 49 is shaped as a smaller rectangular box that at a predefined point on either longitudinal side tapers to a rounded half circular shape; the box itself does not have a top portion for easy access and maintenance. On the left side of the dewatering box 49 is dewatering drain 13 that empties back into the main tank formed from a pipe that is welded to a hole in the bottom thereof and that is welded to the side of the tank. Finally, a cage wash supply line 14 is a pipe that provides water or other liquids into the dewatering box to clarify the materials that have been placed into the box. This supply line 14 is welded or passed within a hole in a longitudinal side of the dewatering box 49.

The dewatering box 49 has a dewatering cage 39 therein; this cage 39 is formed from a group of identically sized parallel wires welded externally to six or seven circular supports arranged symmetrically thereon; additionally, a forward and rear support annuli 37 are welded to the forward and rear portion of the set of parallel wires. These two annuli are inserted within a set of four support rollers 48 at either end of the cage that are attached to the inner surface of the short ends of the dewatering box; the rollers are rubber or metal round pieces having a central hole that permits attachment of a fastener such as a screw to the inner surface of the ends of the dewatering box 49. These ends follow the shape of the longitudinal sides in that they taper from a rectangle or square shape to a rounded half circular shape. Thus, this forms a wire mesh cylinder having openings in the mesh that permit the egress of any liquids but would support solid matter that is progressing through this 'wire mesh cylinder' (dewatering cage 39) from one side to another therein and out the hole 3 at the end thereof.

Next, there is a central annulus used for attachment of the cage drive belt 47; the annulus is welded about the parallel wires in the central portion of dewatering cage 39. It also has a sprocket 35 welded or bolted to the external portion of the annulus; this sprocket has a series of indentations or steps about the external circumferential broad surface of (as opposed to the radial surfaces thereof) that serves to better grip the drive belt 47. Two sets of brushes 46 are attached to the dewatering box 49 using clips 6 that are welded to the inside of the wall of the box; the metal or plastic brush is essentially a linear piece of material that abuts the external surface of the cage thereby removing extra material that may buildup thereon. These brushes are located between the sprocket/annulus and the annuli on either end of the cage. Finally, a cage wash wand 41 is a pipe having various nozzles 38 attached thereto being fed from a cage wash supply line 14 (passing through or welded to a hole in a side of the box 49) into a cage wash wand 41 which is a T shaped fitting that supplies liquid to two closed end wing pipes that can optionally be secured to a side, both sides, one or both of the ends of the dewatering box 49.

Figure 2B:
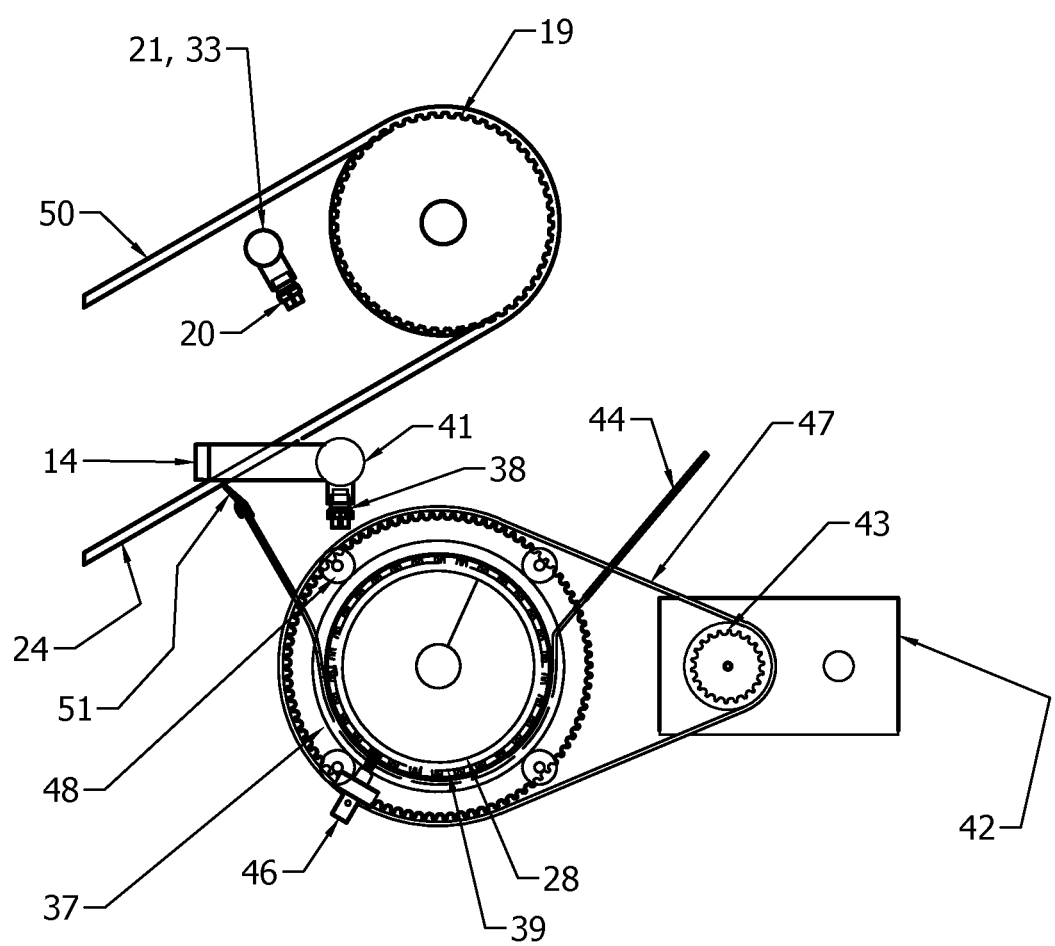
FIG. 2B presents an end view of the belt cleaning and solid collection system in an embodiment.

FIG. 2B presents an end view of the belt cleaning and solid collection system in an embodiment.

Figure 3A:
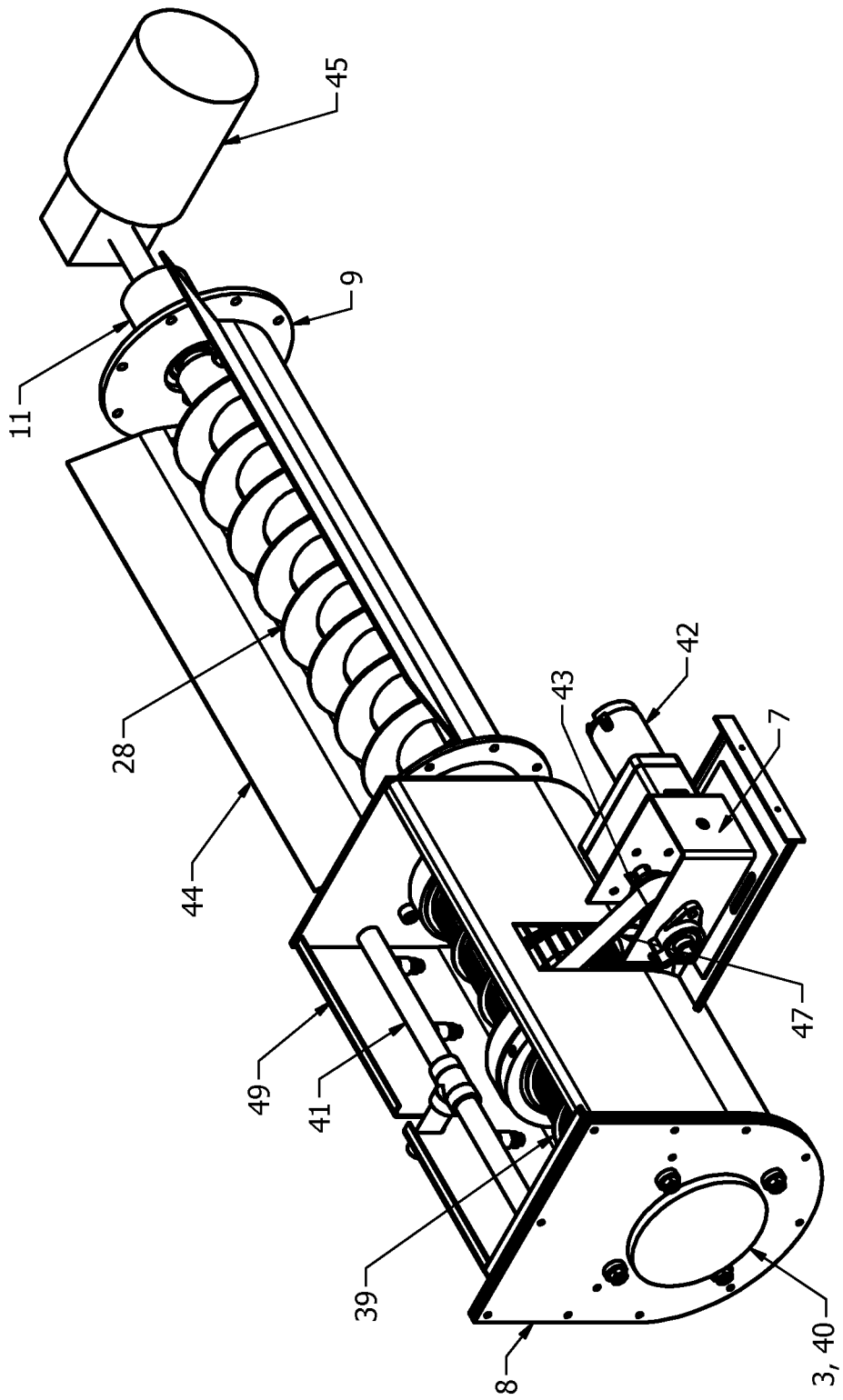
FIG. 3A presents a reverse isometric view of the solids collection and dewatering system in an embodiment.

FIG. 3A presents a reverse isometric view of the solids collection and dewatering system in an embodiment. A dewatering box removable wall 8 is shown in the drawing.

Figure 3B:
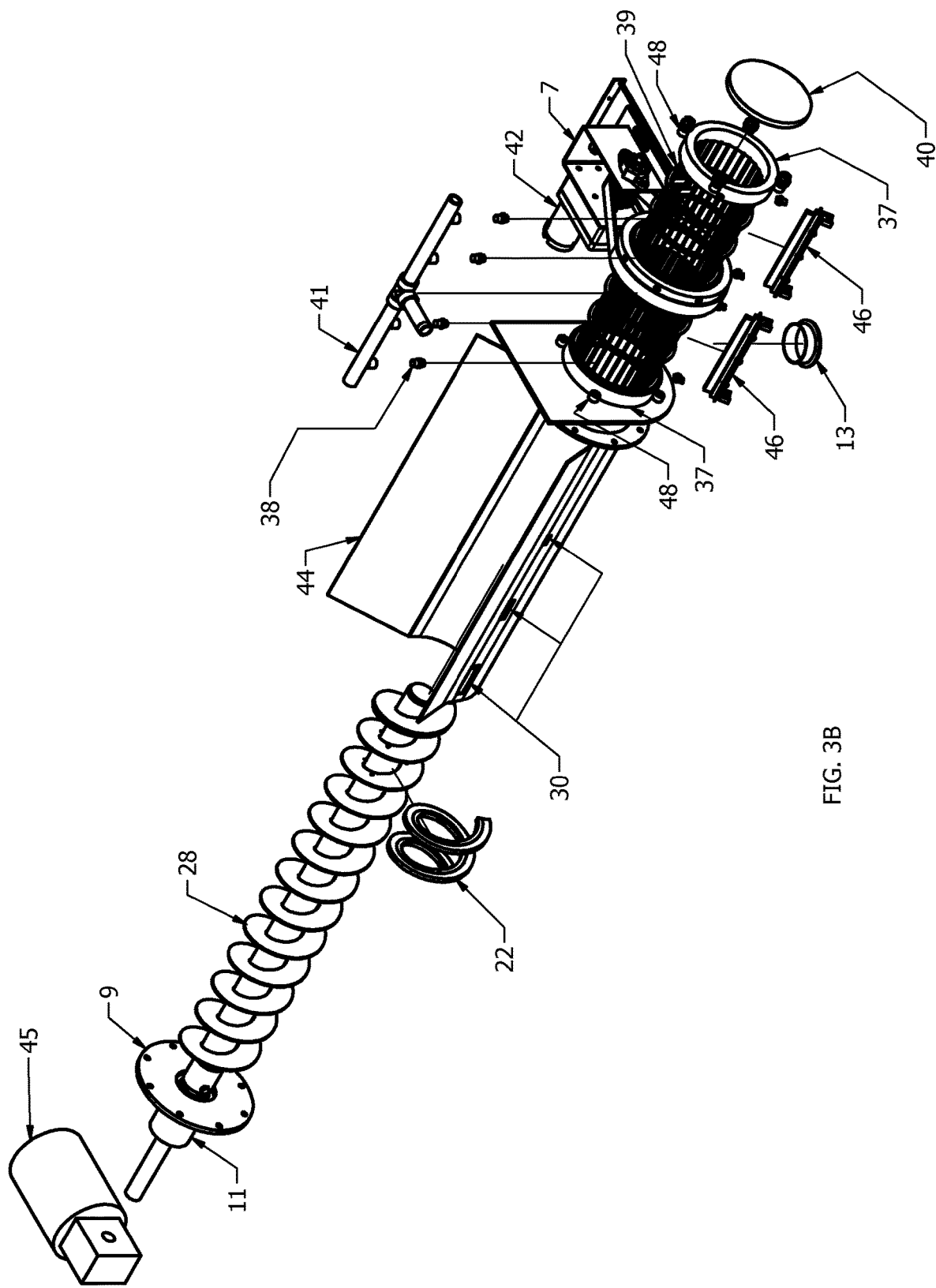
FIG. 3B presents a forward exploded isometric view of the solids collection and dewatering system broken down into various components in an embodiment.

FIG. 3B presents a forward exploded isometric view of the solids collection and dewatering system broken down into various components in an embodiment. An auger flight brush 22 is applied to the auger as appropriate to enable the auger to be self cleaning.

Figure 3C:
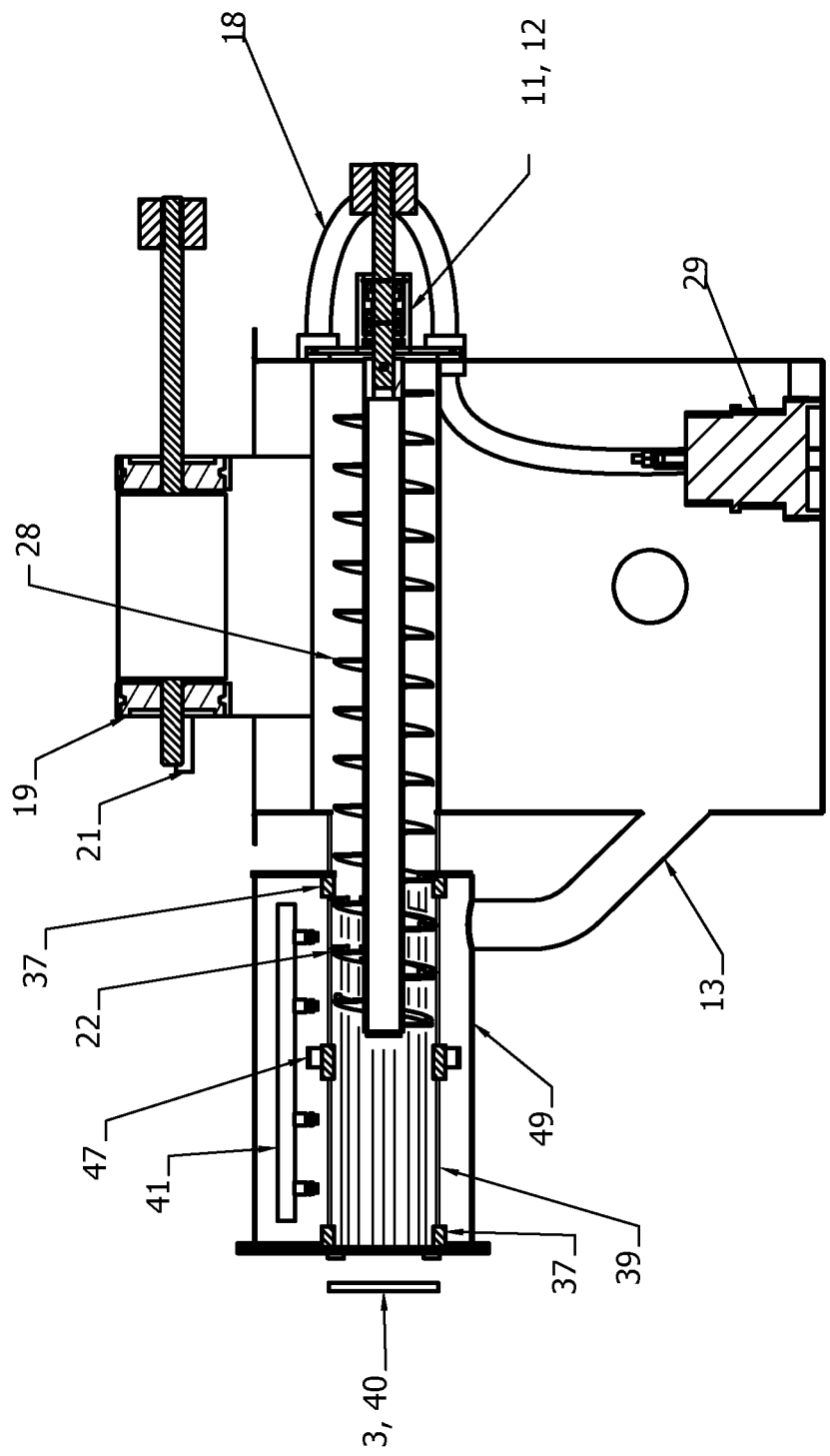
FIG. 3C presents a cross section view of a tank having an auger screw mechanism in an embodiment.

FIG. 3C presents a cross section view of a tank having an auger screw mechanism in an embodiment. This drawing shows that the auger terminates prior to the door. This figure shows where solids accumulate and are further compressed and de-watered prior to exit of device. The drawing also shows were internal brushes 22 are located to clean the inside of the cage. Also, an auger bearing housing 11 and auger bearings 12 are shown herein.

Figure 4A:
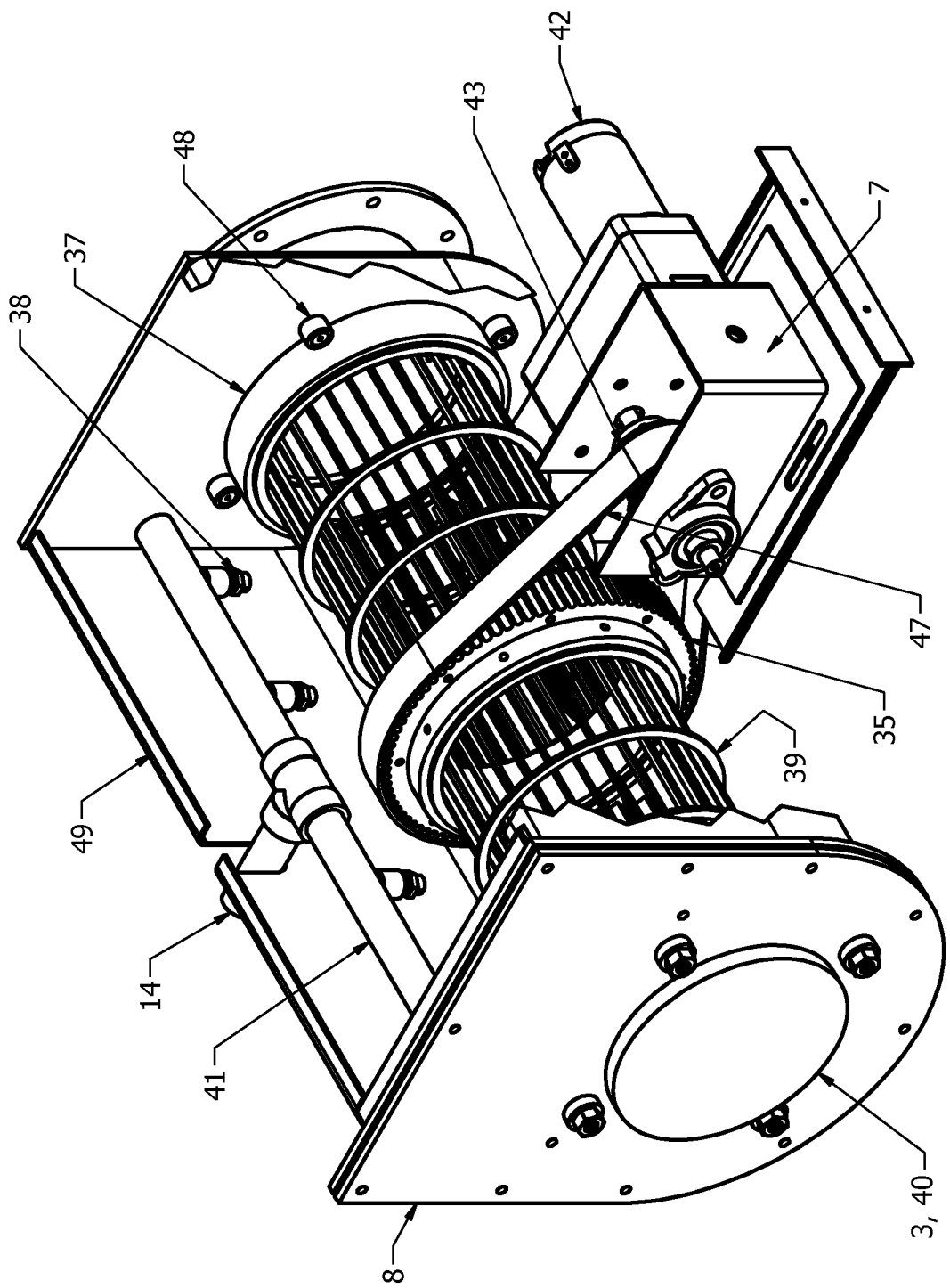
FIG. 4A presents a detailed isometric view of a dewatering box with internals in an embodiment.

FIG. 4A presents a detailed isometric view of a dewatering box with internals in an embodiment. A gear box with electric brake are welded or bolted atop a rectangular bracket 7 that is adjustable using a slot that has a matching slot in another rectangular support underneath it that is permanently mounted to the side of the tank; this slot is used to bolt the bracket to the rectangular support. Finally, a gearbox drives a shaft and small drive sprocket 10 thereby driving the belt 47 causing rotation of the entire cage assembly 39. A cage motor, gear reducer and electric brake assembly 42 are shown along with a cage drive sprocket for effecting rotation of cage drive belt 47.

Figure 4B:
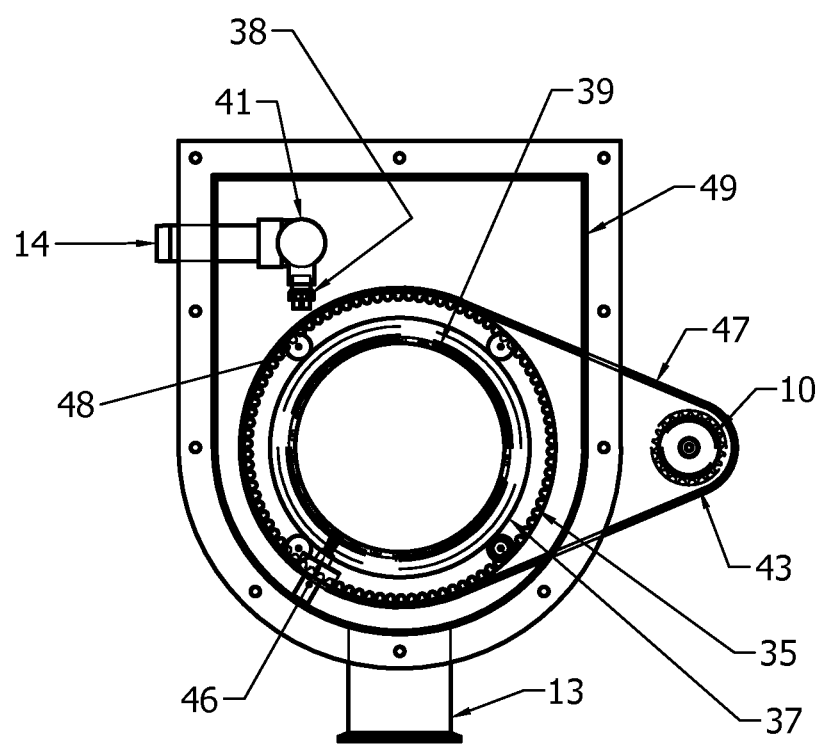
FIG. 4B presents an end view of a dewatering device in an embodiment.

FIG. 4B presents an end view of a dewatering device in an embodiment. A 'cage race' or end annuli 37 for rollers, a cage center mounted sprocket 35 for motor driven rotation, cage wash nozzles 38 are shown. Also, a dewatering drain 13 to lower collection tank 16 is shown in addition to various other devices.

Figure 4C:
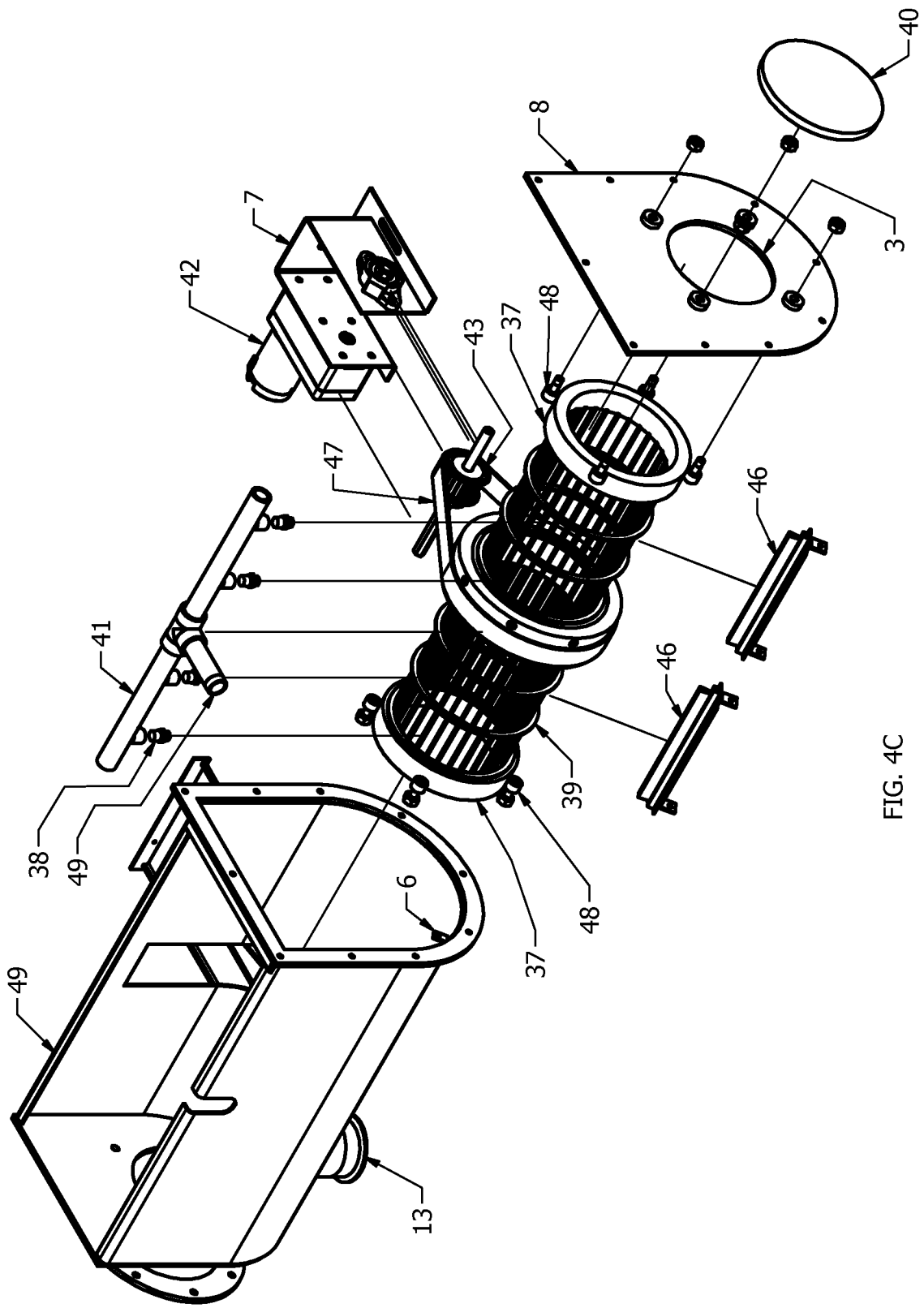
FIG. 4C presents an isometric exploded component view of a dewatering device in an embodiment.

FIG. 4C presents an isometric exploded component view of a dewatering device in an embodiment. A dewatering box removable wall 8 is shown as well.

Figure 5A:
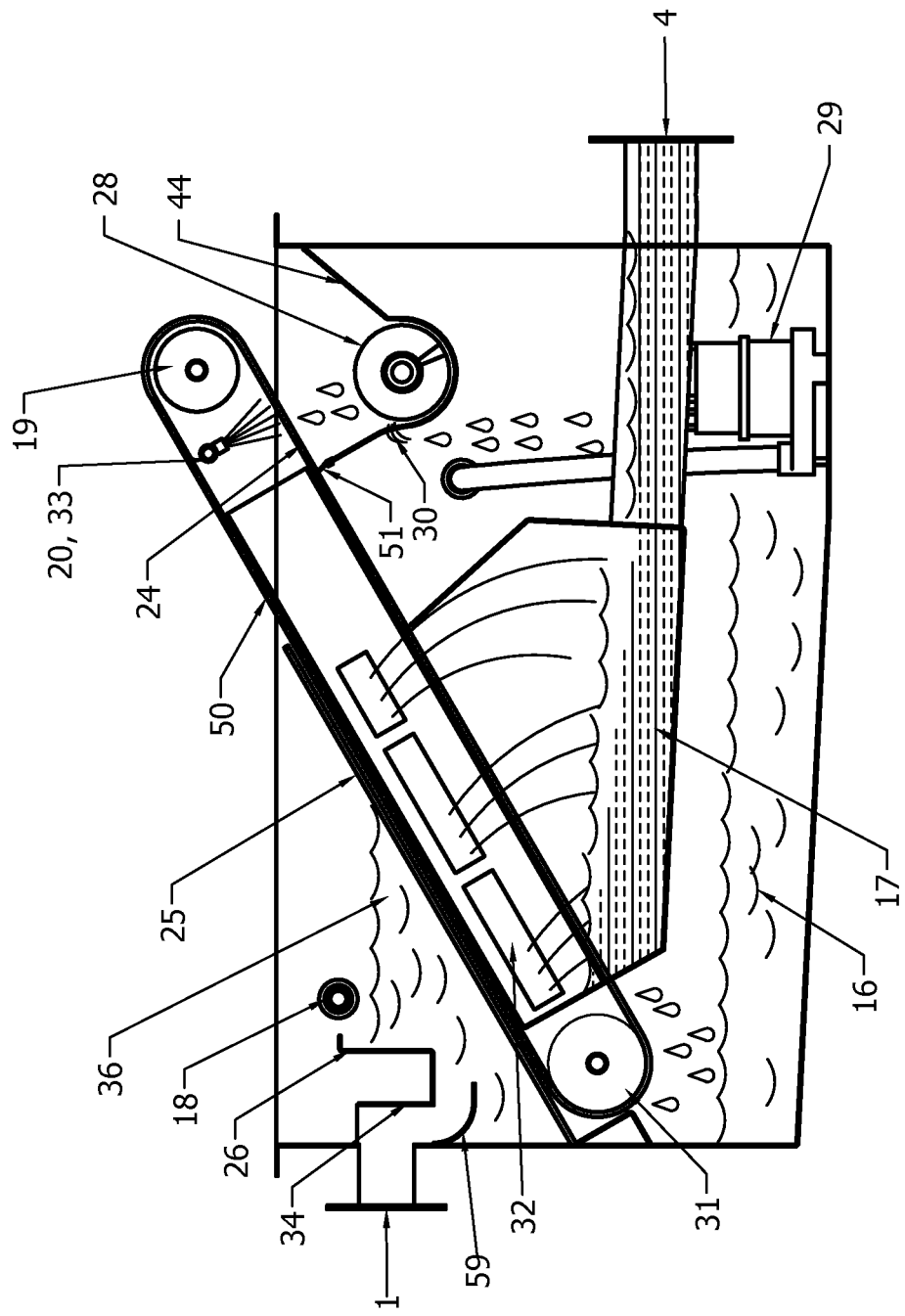
FIG. 5A presents a side view of the Liquid Solid Separator Tank showing the fluid flow therethrough.

FIG. 5A presents a side view of the Liquid Solid Separator Tank showing the fluid flow therethrough. Inlet 1 provides a source of material having a solid liquid mixture to be separated into an influent basin 36. It can be seen here that the inlet diffuser 34 enclosure directs incoming flow downward when entering the tank and then a diffuser diverter panel 59 direct liquids horizontally under the overflow shelf into the influent basin. This influent basin 36 is formed from the front side of the tank, two right walls thereof, the conveyor shroud 25 abutting the inner walls of the tank using their associate rubber strips, a diverter panel 52 having various exit conveyor filtered liquid exit windows 32 arranged as multi dual slanted surfaces staged between perpendicular supports; this panel 52 is inserted underneath the top belt. A filtered water collection basin 17 receives the filtered water 17 therein and sends it outwards via outlet 4; this basin 17 is arranged to have two mirror sub-basins arranged in a U shaped pattern underneath the lower belt 24 more clearly shown in the FIG. 5D. Excess liquid and solid matter flows into trough 44 and escapes via weirs 30 whereupon the mixture falls into main tank basin 16 or 'lower collection basin' used interchangeably herein. Similarly, it should be understood that any liquid or loosed material found in the belt falls down into this basin 16 as it progresses around lower slave roller 31. Finally one or more sump pumps transfer the liquid solid mixture that has not been fully processed from tank basin 16 across pipe 18 to influent basin 36.

Internal filtered water collection basin 17 is welded to the tank walls to create a liquid tight collection channel that directs liquids to the outlet. The front portion of the internal filtered water collection basin has a vertical wall that seals against the conveyor tabs 55 and their respective seals 56 and prevents liquids from being able to escape from the front of the collection channel 17. The cross section in FIG. 5D of that shown in FIG. 5C shows how the side channels are connected and drain to the exit 4 which is the only exit path for the liquids. The belt conveyor is supported on the filtered water collection basin 17 such that the lower belt 24 is designed to sit on top of the inner U shaped walls of the filtered water collection basin 17.

The filtered water collection basin has vertical inner walls that have a lip on the top to create a resting surface for the conveyor. Because the conveyor sits at an angle, it tends to slide down until the conveyor shroud contacts the front wall and conveyor is at rest. The conveyor shroud 25 has a rubber edge 53 that contacts the tank walls that creates a seal between the walls and the shroud. The conveyor shroud directs liquids to the upper belt 50 as liquid mixture is prevented from flowing elsewhere. The upper belt is supported by a plastic smooth support lattice 23 that allows the belt to move and be supported with low friction.

Figure 5B:
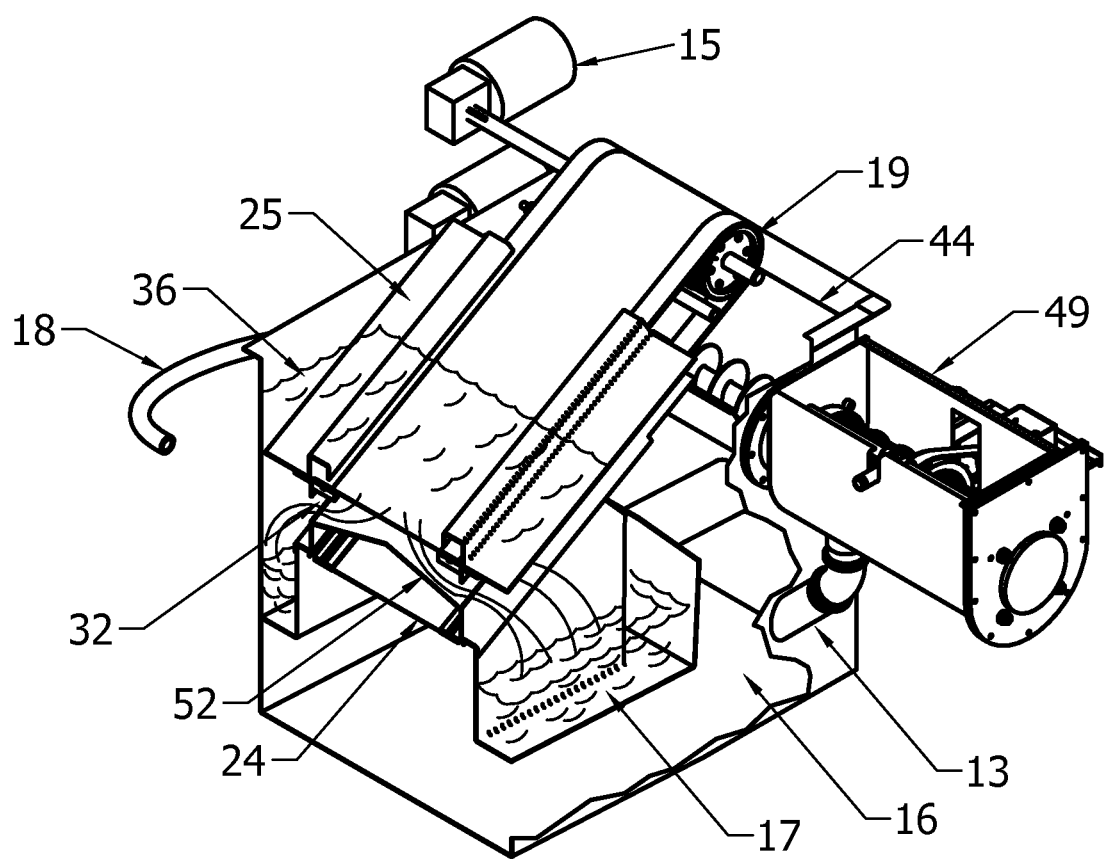
FIG. 5B presents a front breakout view illustrating various fluid flow paths therein in an embodiment.
Figure 5C:
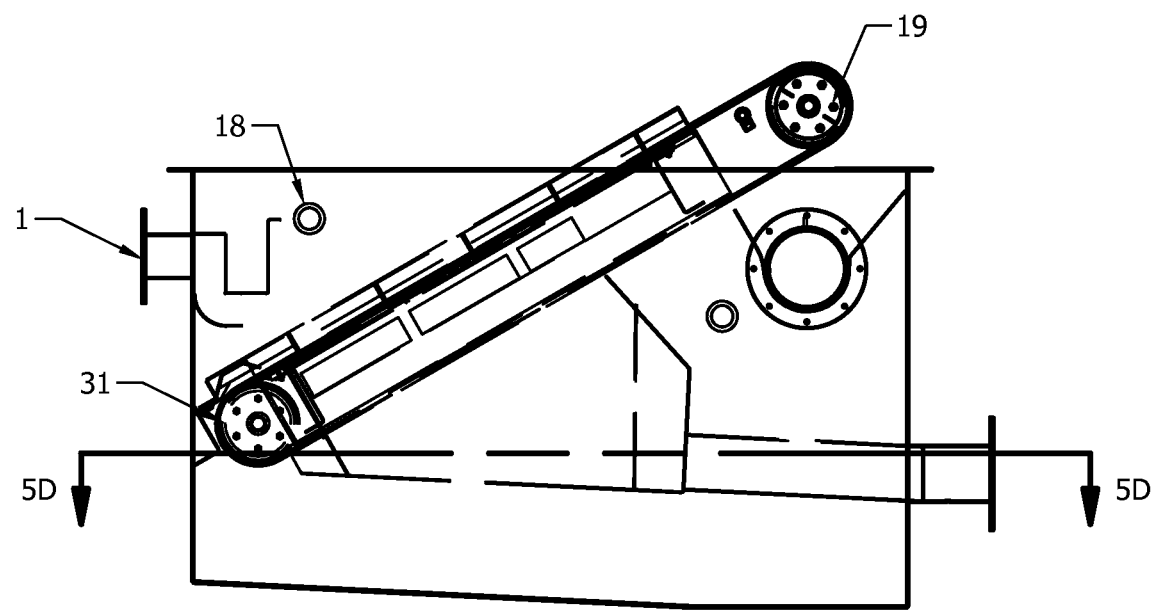
FIG. 5C presents a side view of a filter housing with conveyor installed.

FIG. 5B presents a front breakout view illustrating various fluid flow paths therein in an embodiment. This image shows the two mirror sub basins of the U shaped filtered water collection basin 17 and FIG. 5C presents a side view of a filter housing with conveyor installed.

Figure 5D:
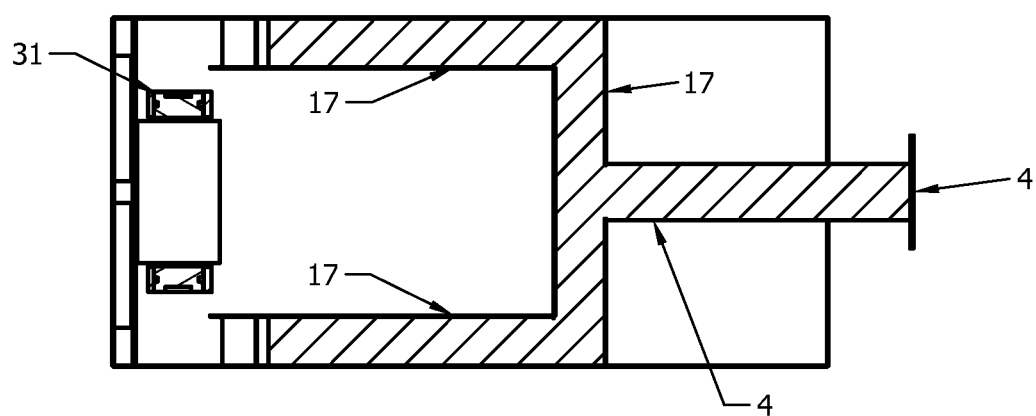
FIG. 5D presents a lower tank section view with highlighted floor plan of internal collection weldment device.

FIG. 5D presents a lower tank section view with highlighted floor plan of internal collection weldment device.

FIG. 6A presents an isometric view of the dewatering box with a side panel removed therefrom. Two sets of brushes are attached to the inner surface of the dewatering box and disposed at an angle so that the forward edges of the brush filaments 46 can impact the sides of the wire cage. The brush filaments are nylon brushes that are crimped into a stainless holder in the following manner. The brush filaments are inserted into an aluminum holder having a channel by sliding the back ends thereof into the channel that captures the filament; this holder is T shaped and has a flat base forming the upper portion of the T and the middle leg thereof is doubled so that there are two parallel longitudinal legs that grasp the back end of the nylon brushes. Next, the channel is crimped together so that the brushes can not come out. The base of the holder is drilled out and bolted to a fabricated stainless bracket 58 that is stiff and designed to not rotate when bolted in place. The bracket is then bolted to support clips 6 that are welded to the inside wall of dewatering device housing as shown. It should be understood that the brushes can wear out and must be replaced in routine maintenance, and because of this they must be removable.

FIG. 6B presents a closeup view of the brushes utilized to clean the external surface of the wire cage.

FIG. 7A present a conveyor plan view with belt and shroud breakout section and side view. A support lattice 23 for the belt is disposed between the upper and lower belts attached to a support frame (not shown). The influent tank basin 36 is sealed by a U shaped shroud 25 having rubber seals 53 about the external portion of shroud 25 and within a central cavity or middle portion between legs of the 'U'. Conveyor tabs 55 with seals 56 that seal against the tank wall and also internal collection front dams 57 that seal against tabs to prevent liquids from exiting the front section of the filtered water collection tank. The 'conveyor' or support frame disposed within and about lower and upper belts has vertical tabs 55 (near the slave roller) that protrude from the sides that also contact the tank wall with rubber seals. The conveyor tabs also have a rubber horizontal seal that is located on the side of the tab closest to the slave roller. As the conveyor slides into place, the main shroud contacts the front wall of the tank, but the tab rubber seal 56 also contacts the angled front dams and seals against them also. This completes a front wall to the collection tank. The main conveyor shroud acts like a roof to the collection tank, making a completely theoretically sealed tank where the only exit is to flow to the rear where the outlet pipe is. This is also why the collection is slightly angled, so that the collection tank is self-draining.

FIG. 7B presents a section view of belt 'conveyor' or support frame in FIG. 7A. After liquids pass thru the upper belt, this figure shows the diverter plate 52 which is seal welded to the conveyor frame. The diverter plate 52 directs liquids to exit the conveyor thru side exit windows 32 cut above the diverter panel 52 that are located in the main beams 5 of the conveyor frame. Liquids are only permitted to leave the conveyor thru these windows which direct liquids horizontally toward the tank walls. The internal filtered water collection basin 17 collects liquids on both the right and left side of the tank and directs liquids together towards the rear of the device and finally into the exit pipe 4. The internal filtered water collection basin 17 is open on the right and left side so that liquids are free to pour into the collection channels on the sides. In the rear, the channel is covered to protect the effluent stream and prevent anything from falling into the effluent from the lower return belt. A shroud tank seal 53 is complemented with a shroud belt seal 54 to enclose the influent tank basin 36.

FIG. 7C presents a side view of a conveyor portion showing rollers, exit windows 32 and more including vertical tabs 55 and vertical seals 56.

Figure 7D:
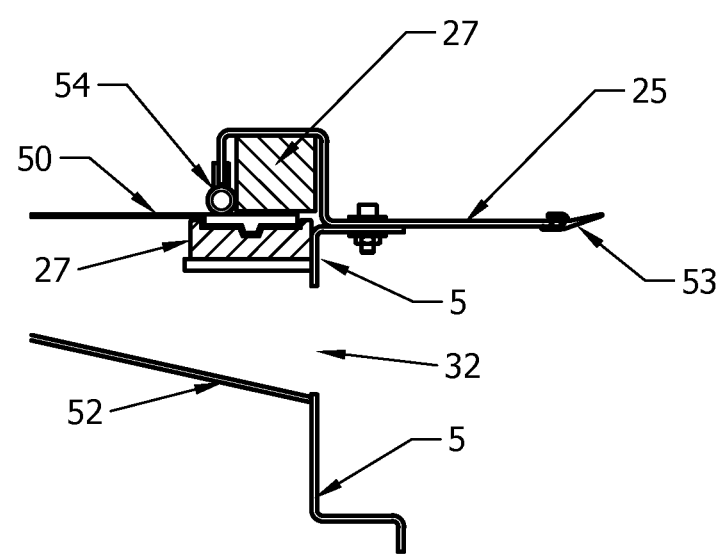
FIG. 7D presents a detail of the conveyor main beam cross section, conveyor shroud and belt track.

FIG. 7D presents a detail of the conveyor main beam cross section, conveyor shroud and belt track 27. An upper filter belt 50 sits between upper and lower belt edge tracks attached to a conveyor or 'support frame' beams 5 that permit outflow from exit windows 32 into a filtered water collection weldment 17.

FIG. 8A presents an exploded Side view of Conveyor and Internal Collection Tank and back wall of main tank. Filter watered collection tank or 'weldment' 17 is composed of a dual or mirror set of sub-basins disposed opposite to one another and integrally united in a U shaped to a pipe outlet 4 at the bottom of the 'U' shape. The back of each sub-basin is a triangular wall disposed downwards following the belt and support frame of the conveyor system; a rectangular ledge juts outwards from the bottom portion of the triangular wall to be welded to a right or left side wall of the tank. At the front portion of the triangular wall is a front dam plate 57 described previously. Directly behind the triangular wall and perpendicular to it is a continuation of the lower ledge forming an intermediate bottom that joins the other sub-basin lower ledge; this lower ledge has an integral forward and rear wall. The forward wall is welded to the back edge of the triangular wall of both sub-basins whilst the rear wall has two flanges one on either side that are disposed at an angle on either side of the triangular wall for sitting the support frame of the conveyor atop it; a raised angled portion is another integral portion of the rear wall having a cutout portion between the two triangular walls. Thus, two sub-basins are formed one either side permitting fluid flow to the outlet 4.

FIG. 8B presents an exploded Front Right Isometric view of Conveyor and Internal Collection Tank and back wall of main tank.

FIG. 8C presents an Exploded Rear Right Isometric view of Conveyor and Internal Collection Tank and back wall of main tank.

General Description of the Invention

A liquid solid mixture enters the plant thru the inlet 1 either by gravity or by means of being pumped. Depending on the inlet velocity of the mixture there may be an inlet diffuser to slow the liquid velocity to prevent excessive turbulence and possible damage to the filter media belt. The liquid solid mixture then accumulates in a tank creating a liquid bath. This portion of the tank is referred to as the influent tank 36 which is part of a singular housing, however is separated by other sections of the tank by gaskets, seals and partitions. At the bottom of the influent tank is a moving filter belt, noted as the upper filter belt 50 that rides on a support lattice 23.

The liquid solid mixture freely passes thru the belt leaving the larger solid debris on the belt; this is possible, as the filter belts are typically constructed of woven fabrics having small openings in the range of 50 to 400 micron openings with a high open area ranging from 15% to 50%. All debris larger than the media openings is captured on the belt which carries the filtered solids upward and out of the liquid bath. At the top of the conveyor is a drive roller 19. After traveling around the drive roller the belt inverts and becomes the lower belt 24. The first cleaning step is achieved by a high pressure wash spray that blasts the debris from the lower belt into the collection trough 44. The spray wash is located above the lower belt (between the upper and lower belt) and sprays the belt from the opposite side of the belt that the debris is accumulated therefore spraying thru the belt to achieve the most efficient cleaning possible. The second cleaning step is a wiper blade 51 that directs belt run off liquids and any remaining debris into the collection trough.

From the figures it can be seen that once the liquid passes thru the upper filter belt, by gravity it is directed laterally to the outside conveyor edges by a diverter panel 52. The liquids exit the conveyor frame thru conveyor windows 32 located in the sides of the conveyor frame. Liquids then drain into the filter water collection area 17 where it drains to the liquid outlet 4 and exits the plant. The conveyor shroud 25 creates a partition between the influent tank and filtered water collection area of the tank, therefore separating the contaminated influent liquids from the filtered effluent liquids. Cross contamination between un-filtered liquids and filtered liquids is not possible without a failure of the sealed partitions and sealing around the belt.

The belt may or may not be moving depending on the mode of operation. The belt speed is typically controlled by a level transmitter located in the influent tank. As the liquid level rises in the influent tank, the belt begins to move. The higher the liquid level is the faster the belt moves. Since the belt quickly becomes fouled, the belt feed equates to the rate at which un-fouled filter media is fed to the tank. Maximum rates of filtration are achieved at the fastest belt speeds however it is preferred to operate the belt at the lowest speeds possible to decrease stress on the system and increase the longevity of wear items. Once the flow of liquids exceed the rate at which the filter belt can pass the liquids, the level in the tank reaches the overflow weir were excess liquids flow into an overflow channel and out the overflow.

There are three sources for un-filtered liquids to accumulate in the lower collection basin (16). First are liquids that are considered run-off. This includes liquids that leak around the lower conveyor slave roller (31), liquids that drip from the wet lower belt (24) and liquids that might leak around the conveyor shroud (25). Second are liquids that are drained from the dewatering cage (39) including the timed wash cycle water. Third are liquids that come from the overflow weirs (30) in the collection through (44). All these streams are collected in the lower collection basin (16) which eventually creates a liquid level. The basin sump pump (29) has a float switch or level transmitter that controls the pump to pump excess liquid back to the influent tank thru an external pump line (18) to be re-filtered.

FIG. 2-4 shows the dewatering system. The first step in the dewatering system is to collect wash water and debris that is blasted from the belt. The wash mix is collected in the collection trough (44) where the collection auger (28) transports the wash mix to the dewatering cage (39). Overflow weirs (30) are located in the collection trough to prevent the liquid level from rising above the auger flights which would overwhelm the auger operation. The dewatering cage is a porous cylindrical cage constructed of either wire of perforated plate. In the first step as the mixture enters the cage, liquid drains thru the openings in the cage while retaining the solids inside the cage. In this section of the cage, the auger flight edges are equipped with brushes (22) that constantly clean the openings in the cage to prevent plugging.

Next the auger terminates in the cylinder and stops conveying the material. Material continues to feed this section until a plug is formed. The plug is further compressed as more material is constantly being added. The compression of the plug results in additional liquids being squeezed out of the solid plug which drain thru the openings in the cage. The plug is compressed by the leading edge of the auger until the pressure of the compaction is great enough to open the discharge door (40) and exit the plant. The discharge door is typically a restricted door designed to open only when significant pressure is applied; the door can be alternatively, a spring loaded door, a pneumatically controlled door, a restriction in the exit opening or any other type of exit restriction common to dewatering equipment or extrusion equipment (elbow joint, cone shaped). All liquids that drain from the cage are collected in a drain (13) that leads down to the lower basin (16).

In order for the dewatering cage to work properly without fouling, the pores in the cage must be routinely cleaned. Brushes (22) allow for some cleaning in the gravity fallout section but do not account for the rest of the cage. A fixed wash wand for the cage (41) is positioned to spray a high pressure spray wash on the outer tangent of the cage. The cage itself is positioned on rollers that allow the cage to be rotated on a timed cycle that is synchronized with the cage wash. On the lower portion of the cage there is a fixed external brush (46) that brushes off outside accumulation on the cage. By rotating the cage the entire cage is cleaned during a cycle. This allows for continuous use and minimizes the need for manual cleaning.

FINAL CONSIDERATIONS

Several fundamental differences between the instant invention and the prior art reside in the use of a water wash on the filter belt whilst eliminating reject streams from the system. In this invention, overflow liquid in the trough and reject liquids from the wedge wire cage are collected in the bottom tank of the machine along with conveyor leakage where a sump pump is located. One or more sump pumps are automated and when a specified liquid level is reached, the pump regulates the amount of material therein by moving it out of the tank through a pipe and discharge above the filter belt so that all non-processed liquids are reprocessed. This has the intended result of eliminating all rejects streams from the apparatus.

As previously discussed, the prior art taught a stationary wire screen and an intermittent water wash to wash off build-up on the exterior of the wire screen. The present invention improves on this by permitting the better sifting of the materials progressing therein as the screen is a motor driven programmable device that rotates on a timed cycle. Further improving on the prior art, there is a high pressure wash that is positioned to blast debris from the wire screen in addition to stationary brushes that are also intended to clear bulk debris from the external portion of the cage during rotation.

Because the wire cage has the ability to completely rotate on rollers, the wash spray and brushes combine to completely wash the screen ensuring a reduced maintenance schedule because of its performance characteristics. As a result, this enhanced self-cleaning feature is expected to significantly improve the ability of the apparatus to keep the wire screen from fouling which is a key deficiency in the prior art designs. Further, the instant invention also has one or more auger brushes on the auger flights for internal cleaning of the auger. Finally, the improved wire cleaning system is a critical feature because by eliminating the reject stream, it makes it less likely that the screw press will foul whereas in the prior art the system would have to be shutdown because there is nowhere for the collected solids to go if they cannot exit the wire screen discharge.

Instead of using a dual drain system that directs excess liquids in the auger conveyor trough out of the machine, this invention completely eliminates the dual drain concept and replaces it with a graduated weir system that doesn't drain the water, but maintains the level at or below a maximum level so as to not flood the screw conveyor. Using a weir system will give better control of trough level since the weirs are located at the desired maximum level throughout the trough where the larger slots/weirs with higher flow capacity are located towards the beginning of the auger screw.

Cage Programmed Control:

The cage cleaning cycle is timed using a PLC that has predetermined cleaning cycles that can be manually adjusted by an operator. Similarly, the auger motor is also controlled by a PLC, however, it is typically set to constantly rotate when the system is active. It should be understood, however, that the rotation of the wire cage encased in the dewatering box is completely independent and controlled by an external PLC. Operational modes can be any combination of either having both auger and cage circulating simultaneously in the same direction or opposite one another; alternatively, the auger can be temporarily stopped during the cleaning cycle and the cage could rotate by itself.

Cage Rollers:

The four radial track rollers that support the cage and allow rotation can be increased to have more than four rollers if necessary. Rollers are shown supporting the ends of the cage cylinder, but their bearings could be adjusted to support the cage at any location. This includes having the bearings located in a groove cut into the end rings of the cage to protect them from the harsh environment of the dewatering box. The only important distinction here is that the cage must be supported with bearings that do not interfere with the cage inside diameter.

A first embodiment of the invention is a liquid solid separator comprising: a container circumscribing an enclosed space closed at its bottom portion and open at its top portion having an inlet for supplying a liquid solid mixture to be separated to an influent basin region above a recirculating filter belt: the recirculating filter belt associated with the container such that the recirculating filter belt is disposed at an angle with respect to the container forming an integral belt rotationally disposed on supports associated with the container; wherein the recirculating filter belt receives the liquid solid mixture and transports the liquid solid mixture to a collector attached to the container and disposed proximal to the recirculating filter belt; wherein said collector has a recirculation overflow weir and such that the recirculation overflow weir drains directly to a lower reject stream recirculation basin; a dewatering box attached to the outside of the container and has a dewatering drain associated therewith; a dewatering rotatable cage moveably associated within the dewatering box and located adjacent to the collector, wherein said dewatering rotatable cage has a space therein and receives the liquid solid mixture from the collector; a motor driven auger associated with the container and disposed nearby the recirculating filter belt and within the collector and within the dewatering rotatable cage; such that the motor driven auger expels solids out of the container from the liquid solid mixture received at the inlet that has then been transported on the recirculating filter belt, through the collector, and into the dewatering rotatable cage within the dewatering box; the lower reject stream recirculation basin situated below the collector and formed from inner surfaces of a lower portion of the container such that the lower reject stream recirculation basin receives a reject stream from the recirculating belt, from the collector, and from the dewatering box; a filtered water collection basin attached internally to the container and underneath the recirculating filter belt as well as disposed directly above the lower reject stream recirculation basin and is connected to a liquid outlet; wherein the filtered water collection basin receives filtered liquids from the liquid solid mixture that have passed through the recirculating filter belt, and transports the filtered liquids through the liquid outlet; a recirculation conduit connected to a reject stream recirculation pump located in the lower recirculation basin and wherein the recirculation conduit is directed to a point in the container above the influent basin region above the recirculating filter belt.

In another aspect, wherein the collector further comprises: a second recirculation overflow weir on the collector.

In another aspect, further comprising: a plurality of recirculation overflow weirs that includes the first recirculation control overflow weir on the collector.

In another aspect, wherein the dewatering box further comprises: a rotatable cage spray wash device located and proximal to the rotatable cage and physically supported by the container.

In another aspect, wherein the dewatering box attached to the container runner comprises: a stationary brush mount attached to an inner surface of the dewatering box and external to the rotatable cage associated with the dewatering vessel; and further having a brush mounted within the stationary brush mount wherein the brush impacts an external surface of the rotatable cage.

In another aspect, further comprising: a spray wash device associated with the dewatering box; and a belt wash system located near the recirculating filter belt.

In another aspect, wherein the plurality of recirculation overflow weirs on the collector are graduated in size as they proceed down a side of the collector.

In another aspect, further comprising: wherein the plurality of recirculation overflow weirs on the collector are graduated in size as they proceed down the side of the collector such that they are larger farther from the dewatering box and smaller closer to the dewatering box.

In another aspect, further comprising: a cage spray wash device located proximal to the dewatering rotatable cage and physically supported by the container; a brush mounted to an inner surface of the dewatering box; and a belt wash system located near the recirculating filter belt.

What is claimed is:

1. A liquid solid separator comprising:
   a container circumscribing an enclosed space closed at its bottom portion and open at its top portion having an inlet for supplying a liquid solid mixture to be separated to an influent basin region above a recirculating filter belt:
   the recirculating filter belt associated with the container such that the recirculating filter belt is disposed at an angle with respect to the container forming an integral belt rotationally disposed on supports associated with the container; wherein the recirculating filter belt receives the liquid solid mixture and transports the liquid solid mixture to a collector attached to the container and disposed proximal to the recirculating filter belt;

wherein said collector has a recirculation overflow weir and such that the recirculation overflow weir drains directly to a lower reject stream recirculation basin;

a dewatering box attached to the outside of the container and has a dewatering drain associated therewith;

a dewatering rotatable cage moveably associated within the dewatering box and located adjacent to the collector, wherein said dewatering rotatable cage has a space therein and receives the liquid solid mixture from the collector;

a motor driven auger associated with the container and disposed nearby the recirculating filter belt and within the collector and within the dewatering rotatable cage; such that the motor driven auger expels solids out of the container from the liquid solid mixture received at the inlet that has then been transported on the recirculating filter belt, through the collector, and into the dewatering rotatable cage within the dewatering box;

the lower reject stream recirculation basin situated below the collector and formed from inner surfaces of a lower portion of the container such that the lower reject stream recirculation basin receives a reject stream from the recirculating belt, from the collector, and from the dewatering box;

a filtered water collection basin attached internally to the container and underneath the recirculating filter belt as well as disposed directly above the lower reject stream recirculation basin and is connected to a liquid outlet; wherein the filtered water collection basin receives filtered liquids from the liquid solid mixture that have passed through the recirculating filter belt, and transports the filtered liquids through the liquid outlet;

a recirculation conduit connected to a reject stream recirculation pump located in the lower recirculation basin and wherein the recirculation conduit is directed to a point in the container above the influent basin region above the recirculating filter belt.

2. The liquid solid separator of claim 1, wherein the collector further comprises: a second recirculation overflow weir on the collector.

3. The liquid solid separator of claim 2, further comprising: a plurality of recirculation overflow weirs that includes the first recirculation control overflow weir on the collector.

4. The liquid solid separator of claim 1, wherein the dewatering box further comprises:
a rotatable cage spray wash device located proximal to the rotatable cage and physically supported by the container.

5. The liquid solid separator of claim 1, wherein the dewatering box attached to the container further comprises:
a stationary brush mount attached to an inner surface of the dewatering box and external to the rotatable cage associated with the dewatering box; and further having
a brush mounted within the stationary brush mount wherein the brush impacts an external surface of the rotatable cage.

6. The liquid solid separator of claim 1, further comprising: a spray wash device associated with the dewatering box;
and a belt wash system located near the recirculating filter belt.

7. The liquid solid separator of claim 3,
wherein the plurality of recirculation overflow weirs on the collector are graduated in size as they proceed down a side of the collector.

8. The liquid solid separator device of claim 7, further comprising:
wherein the plurality of recirculation overflow weirs on the collector are graduated in size as they proceed down the side of the collector such that they are larger farther from the dewatering box and smaller closer to the dewatering box.

9. The liquid solid separator of claim 1, further comprising:
a cage spray wash device located proximal to the dewatering rotatable cage and physically supported by the container;
a brush mounted to an inner surface of the dewatering box;
and a belt wash system located near the recirculating filter belt.

* * * * *